US009643667B2

(12) United States Patent
Hansen

(10) Patent No.: US 9,643,667 B2
(45) Date of Patent: *May 9, 2017

(54) CONVERSION SYSTEM FOR A WHEELED VEHICLE

(71) Applicant: Loegering Mfg. Inc., Casselton, ND (US)

(72) Inventor: Ronald S. Hansen, Leonard, ND (US)

(73) Assignee: A.S.V., LLC

( * ) Notice: Subject to any disclaimer, the term of this patent is extended or adjusted under 35 U.S.C. 154(b) by 119 days.

This patent is subject to a terminal disclaimer.

(21) Appl. No.: 14/450,401

(22) Filed: Aug. 4, 2014

(65) Prior Publication Data

US 2014/0338991 A1 Nov. 20, 2014

Related U.S. Application Data

(63) Continuation of application No. 12/519,007, filed as application No. PCT/US2007/087296 on Dec. 12, 2007, now Pat. No. 8,794,358.

(Continued)

(51) Int. Cl.
   *B62D 55/04* (2006.01)
   *B62D 55/084* (2006.01)
   (Continued)

(52) U.S. Cl.
   CPC ........... *B62D 55/04* (2013.01); *B62D 55/084* (2013.01); *B62D 55/10* (2013.01); *B62D 55/108* (2013.01); *Y10T 29/49716* (2015.01)

(58) Field of Classification Search
   CPC ...... B62D 55/04; B62D 55/084; B62D 55/10; B62D 55/32; B62M 27/02
   See application file for complete search history.

(56) References Cited

U.S. PATENT DOCUMENTS

| 112,460 A | 3/1871 | House |
| 994,317 A | 6/1911 | Holt |

(Continued)

FOREIGN PATENT DOCUMENTS

| CA | 976213 | 10/1975 |
| CA | 2 672 499 | 6/2008 |

(Continued)

OTHER PUBLICATIONS

Modern Machinery Magazine, advertisement for LeeBoy 8816 Asphalt Paver, 2005 No. 2, Copyright 2005, Construction Publications Inc., USA.

(Continued)

*Primary Examiner* — S. Joseph Morano
*Assistant Examiner* — Maurice Williams
(74) *Attorney, Agent, or Firm* — Moore & Hansen, PLLC; Robert C. Freed

(57) ABSTRACT

A track assembly 30 for converting a wheeled vehicle 10 into a tracked vehicle. The track assembly 30 has a longitudinally adjustable support frame 40 having a motive source 170 with a drive sprocket 190, a plurality of support rollers 80, 84, 88, a tensioning assembly 90, and an endless track 200. The track assembly 30 is connected to a vehicle 10 by articulated, resiliently biased mounting assemblies 210, 410. Each mounting assembly 210, 410 includes a first attachment member 212, 412, a link 250, 450, and a second attachment member 300, 500, with the first attachment member 212, 412 configured to be removably attached to a position on a vehicle 10 where a wheel axle attached to an internal drive unit 19 would normally reside but which has been disconnected from its control lines and removed, and with the second attachment member 300, 500 configured to be connected to the support frame 40. The motive source 170 of the track assembly 30 is connected to and controlled by (Continued)

the same control lines 18 that were previously connected to the internal drive unit 19.

17 Claims, 19 Drawing Sheets

Related U.S. Application Data

(60) Provisional application No. 60/874,383, filed on Dec. 12, 2006.

(51) Int. Cl.
 *B62D 55/10* (2006.01)
 *B62D 55/108* (2006.01)

(56) References Cited

U.S. PATENT DOCUMENTS

| | | |
|---|---|---|
| 1,003,110 A | 9/1911 | Holt |
| 1,038,569 A | 9/1912 | Grover |
| 1,112,460 A | 10/1914 | Leavitt |
| 1,237,970 A | 8/1917 | Strait |
| 1,301,040 A | 4/1919 | Colahan |
| 1,354,219 A | 9/1920 | Seltenright |
| 1,388,637 A | 8/1921 | French |
| 1,510,988 A | 10/1924 | French |
| 1,636,829 A | 7/1927 | Neighbour |
| 1,808,735 A | 6/1931 | Henneuse et al. |
| 1,810,138 A | 6/1931 | Kincannon |
| 1,856,068 A | 5/1932 | Christie |
| 2,067,008 A | 1/1937 | Fergueson |
| 2,105,917 A | 1/1938 | Herrington |
| 2,111,587 A | 3/1938 | Goldstine |
| 2,206,158 A | 7/1940 | Budd |
| 2,421,904 A | 6/1947 | Penote |
| 2,467,947 A | 4/1949 | Skelton |
| 2,496,136 A | 1/1950 | Smith |
| 2,533,271 A | 12/1950 | Livermon |
| 2,584,512 A | 2/1952 | Strait |
| 2,598,863 A | 6/1952 | Tucker |
| 2,618,349 A | 11/1952 | Ludema |
| 2,676,450 A | 4/1954 | Schaaf et al. |
| 2,719,062 A | 9/1955 | Arps |
| 2,852,317 A | 9/1958 | Riemerschmid |
| 3,072,443 A | 1/1963 | Yoe |
| 3,082,044 A | 3/1963 | Klemm et al. |
| 3,099,098 A | 7/1963 | Davis |
| 3,163,249 A | 12/1964 | Ledohowski |
| 3,165,364 A | 1/1965 | Hardman et al. |
| 3,173,236 A | 3/1965 | Byrd |
| 3,190,384 A | 6/1965 | Dufresne |
| 3,241,889 A | 3/1966 | Borisov et al. |
| 3,304,703 A | 2/1967 | Schaaf |
| 3,361,221 A | 1/1968 | Tyler |
| 3,381,424 A | 5/1968 | Butler |
| 3,412,820 A | 11/1968 | Wachholz |
| 3,447,620 A | 6/1969 | Schoonover |
| 3,458,214 A | 7/1969 | West |
| 3,584,444 A | 6/1971 | Sammann et al. |
| 3,601,424 A | 8/1971 | Badland |
| 3,602,470 A | 8/1971 | Reynolds |
| 3,647,270 A | 3/1972 | Althaus |
| 3,682,266 A | 8/1972 | Stoliker |
| 3,689,123 A | 9/1972 | Barbieri |
| 3,710,886 A | 1/1973 | Wagner |
| 3,719,242 A | 3/1973 | Duclo |
| 3,733,107 A | 5/1973 | Cote et al. |
| 3,736,032 A | 5/1973 | Mosshart et al. |
| 3,737,001 A | 6/1973 | Rasenberger |
| 3,741,331 A | 6/1973 | Kowalik |
| 3,768,878 A | 10/1973 | Garman |
| 3,771,241 A | 11/1973 | Lindell et al. |
| 3,774,708 A | 11/1973 | Purcell et al. |
| 3,787,099 A | 1/1974 | Tucker et al. |
| D230,300 S | 2/1974 | Oestmann et al. |
| 3,789,942 A | 2/1974 | Kowalik |
| 3,826,388 A | 7/1974 | Oldenburg et al. |
| 3,841,424 A | 10/1974 | Purcell et al. |
| 3,857,616 A | 12/1974 | Tucker et al. |
| 3,869,010 A | 3/1975 | Stedman |
| 3,885,641 A | 5/1975 | Harris |
| 3,921,743 A | 11/1975 | Parrish |
| 3,929,204 A | 12/1975 | Newell |
| 3,938,606 A | 2/1976 | Yancey |
| 4,023,624 A | 5/1977 | Frisbee |
| 4,042,053 A | 8/1977 | Sieren et al. |
| 4,043,417 A | 8/1977 | Orpana |
| 4,089,565 A | 5/1978 | Loegering et al. |
| 4,100,990 A | 7/1978 | Stedman |
| 4,109,971 A | 8/1978 | Black et al. |
| 4,227,749 A | 10/1980 | Hesse |
| 4,299,425 A | 11/1981 | Renz et al. |
| 4,313,516 A | 2/1982 | Terry |
| 4,406,501 A | 9/1983 | Christensen |
| 4,429,516 A | 2/1984 | Erickson |
| 4,448,273 A | 5/1984 | Barbieri |
| 4,458,954 A | 7/1984 | Haas |
| 4,459,932 A | 7/1984 | Hildebrand |
| 4,553,790 A | 11/1985 | Boggs |
| 4,592,693 A | 6/1986 | Perrot |
| 4,708,218 A | 11/1987 | Mäkelä |
| 4,712,469 A | 12/1987 | Hesse |
| 4,722,174 A | 2/1988 | Landry et al. |
| 4,726,631 A | 2/1988 | Jones et al. |
| 4,817,746 A | 4/1989 | Purcell et al. |
| 4,865,141 A | 9/1989 | Gey |
| 4,869,354 A | 9/1989 | Brazier |
| 4,936,639 A | 6/1990 | Pohjola |
| 4,944,562 A | 7/1990 | Garrison |
| 4,953,919 A | 9/1990 | Langford |
| 4,966,242 A | 10/1990 | Baillargeon |
| 5,005,920 A | 4/1991 | Kinsinger |
| 5,018,591 A | 5/1991 | Price |
| 5,033,214 A | 7/1991 | Kaczmarski et al. |
| D327,692 S | 7/1992 | Kaczmarski et al. |
| 5,165,765 A | 11/1992 | Baylor |
| 5,203,101 A | 4/1993 | Bryan |
| 5,237,888 A | 8/1993 | McCombs |
| 5,240,084 A | 8/1993 | Christianson |
| 5,246,246 A | 9/1993 | Kendall |
| 5,273,126 A | 12/1993 | Reed et al. |
| 5,284,387 A | 2/1994 | Loegering |
| 5,316,381 A | 5/1994 | Isaacson et al. |
| 5,343,960 A | 9/1994 | Gilbert |
| 5,352,026 A | 10/1994 | Snook |
| 5,361,860 A | 11/1994 | Smith et al. |
| 5,368,115 A | 11/1994 | Crabb |
| 5,388,656 A | 2/1995 | Lagasse |
| 5,409,305 A | 4/1995 | Nagorcka |
| 5,413,181 A | 5/1995 | Keigley |
| 5,429,429 A | 7/1995 | Loegering et al. |
| 5,452,949 A | 9/1995 | Kelderman |
| D364,879 S | 12/1995 | Bastian et al. |
| 5,509,220 A | 4/1996 | Cooper |
| 5,515,625 A | 5/1996 | Keigley |
| 5,566,773 A | 10/1996 | Gersmann |
| D375,506 S | 11/1996 | Bastian et al. |
| 5,607,210 A | 3/1997 | Brazier |
| D378,755 S | 4/1997 | Kato et al. |
| 5,622,234 A | 4/1997 | Nagorcka et al. |
| 5,709,394 A | 1/1998 | Martin et al. |
| 5,725,204 A | 3/1998 | Yoshida |
| 5,768,811 A | 6/1998 | Cooper |
| 5,788,265 A | 8/1998 | McLaughlin |
| 5,829,848 A | 11/1998 | Kelderman |
| 5,842,757 A | 12/1998 | Kelderman |
| D406,151 S | 2/1999 | Cunningham et al. |
| 5,927,412 A | 7/1999 | Crabb |
| RE36,284 E | 8/1999 | Kelderman |
| 5,954,148 A | 9/1999 | Okumura et al. |
| 5,988,776 A | 11/1999 | Zurn |
| 5,992,943 A | 11/1999 | Sheets et al. |
| 6,007,166 A | 12/1999 | Tucker et al. |

(56) References Cited

U.S. PATENT DOCUMENTS

| | | | |
|---|---|---|---|
| D422,606 S | 4/2000 | Katoh et al. | |
| D425,526 S | 5/2000 | Juncker et al. | |
| 6,062,327 A | 5/2000 | Ketting et al. | |
| 6,062,661 A | 5/2000 | Juncker et al. | |
| 6,062,662 A | 5/2000 | Witt | |
| 6,068,353 A | 5/2000 | Juncker et al. | |
| 6,074,024 A | 6/2000 | Juncker | |
| 6,074,025 A | 6/2000 | Juncker et al. | |
| 6,079,519 A | 6/2000 | Lottes | |
| 6,095,275 A | 8/2000 | Shaw | |
| 6,116,362 A | 9/2000 | Schubert et al. | |
| 6,129,426 A | 10/2000 | Tucker | |
| 6,176,334 B1 | 1/2001 | Lorenzen | |
| 6,176,344 B1 | 1/2001 | Lester | |
| D438,546 S | 3/2001 | Katoh et al. | |
| 6,199,646 B1 | 3/2001 | Tani et al. | |
| 6,305,762 B1 | 10/2001 | Oertley | |
| 6,318,484 B2 | 11/2001 | Lykken et al. | |
| 6,322,171 B1 | 11/2001 | Fornes | |
| 6,401,847 B1 | 6/2002 | Lykken | |
| 6,408,965 B1 | 6/2002 | Grant | |
| 6,447,077 B1 | 9/2002 | Durick et al. | |
| 6,536,854 B2 | 3/2003 | Juncker et al. | |
| 6,543,861 B1 | 4/2003 | Kahle et al. | |
| 6,543,862 B1 | 4/2003 | Kahle et al. | |
| 6,547,345 B2 | 4/2003 | Phely | |
| 6,557,953 B1 | 5/2003 | Kahle et al. | |
| 6,588,778 B1 | 7/2003 | McLaughlin | |
| 6,615,939 B1 | 9/2003 | Karales et al. | |
| 6,640,915 B2 | 11/2003 | Haringer | |
| D483,043 S | 12/2003 | Akashima et al. | |
| D488,171 S | 4/2004 | Juncker et al. | |
| D489,381 S | 5/2004 | Mistry et al. | |
| D497,621 S | 10/2004 | Inaoka et al. | |
| 6,805,311 B2 | 10/2004 | Buller | |
| D499,748 S | 12/2004 | Komatsu et al. | |
| 6,832,659 B1 * | 12/2004 | Bares | B62D 55/084 180/19.1 |
| 6,840,338 B2 | 1/2005 | Bowers et al. | |
| D501,487 S | 2/2005 | Katoh et al. | |
| D505,136 S | 5/2005 | Brazier | |
| 6,889,782 B2 | 5/2005 | Komatsu et al. | |
| 6,904,986 B2 | 6/2005 | Brazier | |
| RE38,779 E | 8/2005 | Lovitt, Jr. | |
| 6,926,105 B2 | 8/2005 | Brazier | |
| 6,929,334 B2 | 8/2005 | Verheye et al. | |
| D510,742 S | 10/2005 | Stover | |
| 6,968,914 B2 | 11/2005 | Tucker | |
| D513,268 S | 12/2005 | Wang et al. | |
| 6,981,563 B2 | 1/2006 | Phely et al. | |
| 6,983,812 B2 | 1/2006 | Tucker | |
| D514,596 S | 2/2006 | Radke | |
| D523,027 S | 6/2006 | Yamashita et al. | |
| D523,874 S | 6/2006 | Hagele | |
| 7,077,216 B2 | 7/2006 | Juncker | |
| D525,992 S | 8/2006 | Higashikawa et al. | |
| D526,335 S | 8/2006 | Kuwae et al. | |
| 7,083,241 B2 | 8/2006 | Gunter | |
| D528,133 S | 9/2006 | Brazier | |
| 7,100,715 B2 | 9/2006 | Mukaino et al. | |
| 7,111,697 B2 | 9/2006 | Brazier | |
| D529,932 S | 10/2006 | Yamashita et al. | |
| 7,156,185 B2 | 1/2007 | Juncker | |
| 7,172,257 B2 | 2/2007 | Tamaru et al. | |
| 7,178,446 B2 | 2/2007 | Kucher et al. | |
| D540,829 S | 4/2007 | Johnson et al. | |
| 7,201,242 B2 | 4/2007 | Tucker, Jr. | |
| 7,222,924 B2 | 5/2007 | Christianson | |
| 7,229,140 B2 | 6/2007 | Page et al. | |
| 7,255,184 B2 | 8/2007 | Loegering et al. | |
| D553,159 S | 10/2007 | Higashikawa et al. | |
| 7,296,862 B2 | 11/2007 | Albright et al. | |
| D556,789 S | 12/2007 | Kitayama et al. | |
| D556,791 S | 12/2007 | Brazier | |
| D558,797 S | 1/2008 | Yamamoto et al. | |
| D559,277 S | 1/2008 | Tsujita et al. | |
| D559,278 S | 1/2008 | Tsujita et al. | |
| 7,370,918 B2 | 5/2008 | Tucker | |
| D581,953 S | 12/2008 | Matsumoto et al. | |
| 7,467,831 B2 | 12/2008 | Bertoni | |
| D587,727 S | 3/2009 | Vos et al. | |
| D593,135 S | 5/2009 | Hansen | |
| D593,136 S | 5/2009 | Hansen | |
| 7,552,979 B2 | 6/2009 | Christianson | |
| 7,597,161 B2 | 10/2009 | Brazier | |
| 7,770,984 B2 | 8/2010 | Schmit et al. | |
| 7,828,396 B2 | 11/2010 | Weiser | |
| 7,866,420 B1 | 1/2011 | Claas et al. | |
| 7,891,743 B2 | 2/2011 | Ballard | |
| 7,997,666 B2 | 8/2011 | Bordini | |
| 8,240,783 B2 | 8/2012 | Johnson et al. | |
| 8,430,188 B2 * | 4/2013 | Hansen | B62D 55/04 180/9.26 |
| 2001/0005693 A1 | 6/2001 | Korus | |
| 2002/0044500 A1 | 4/2002 | Hansen | |
| 2002/0101170 A1 | 8/2002 | Dunphy et al. | |
| 2002/0139226 A1 | 10/2002 | Hansen | |
| 2002/0178622 A1 | 12/2002 | Loegering et al. | |
| 2002/0179343 A1 | 12/2002 | Theilen | |
| 2003/0011537 A1 | 1/2003 | Dunphy et al. | |
| 2003/0015909 A1 | 1/2003 | Meek, Jr. | |
| 2003/0034189 A1 | 2/2003 | Lemke et al. | |
| 2003/0058196 A1 | 3/2003 | Hansen et al. | |
| 2003/0201954 A1 | 10/2003 | Hansen et al. | |
| 2004/0017109 A1 | 1/2004 | Deland et al. | |
| 2004/0045747 A1 | 3/2004 | Albright et al. | |
| 2004/0108976 A1 | 6/2004 | Hansen | |
| 2004/0119336 A1 | 6/2004 | Lussier | |
| 2004/0140138 A1 | 7/2004 | Brazier | |
| 2005/0035650 A1 | 2/2005 | Toews | |
| 2005/0061557 A1 | 3/2005 | Brazier | |
| 2005/0110346 A1 | 5/2005 | Albright et al. | |
| 2005/0126328 A1 | 6/2005 | Piotrowski et al. | |
| 2005/0145422 A1 | 7/2005 | Loegering et al. | |
| 2005/0167969 A1 * | 8/2005 | Fukazawa | B62D 55/06 280/785 |
| 2005/0252592 A1 | 11/2005 | Albright et al. | |
| 2005/0252698 A1 | 11/2005 | Brazier | |
| 2005/0274235 A1 | 12/2005 | Hansen | |
| 2006/0113121 A1 | 6/2006 | Radke et al. | |
| 2006/0114188 A1 | 6/2006 | Hansen et al. | |
| 2006/0118662 A1 | 6/2006 | Korus | |
| 2006/0138739 A1 | 6/2006 | Rasset et al. | |
| 2006/0237564 A1 | 10/2006 | Korus | |
| 2006/0289676 A1 | 12/2006 | Korus | |
| 2007/0017313 A1 | 1/2007 | Pattok et al. | |
| 2007/0068051 A1 | 3/2007 | Mills et al. | |
| 2007/0068320 A1 | 3/2007 | Hastings | |
| 2007/0131806 A1 | 6/2007 | Starr | |
| 2007/0176030 A1 | 8/2007 | Korus | |
| 2008/0054105 A1 | 3/2008 | Korus | |
| 2009/0087260 A1 | 4/2009 | Korus et al. | |
| 2009/0302676 A1 | 12/2009 | Brazier | |
| 2009/0308669 A1 | 12/2009 | Vos et al. | |
| 2010/0060075 A1 | 3/2010 | Hansen | |
| 2010/0139994 A1 | 6/2010 | Hansen | |
| 2010/0194188 A1 | 8/2010 | Johnson et al. | |
| 2010/0295870 A1 | 11/2010 | Baghdadi et al. | |
| 2011/0028561 A1 | 2/2011 | Akula et al. | |
| 2011/0101135 A1 | 5/2011 | Korus et al. | |
| 2011/0127344 A1 | 6/2011 | Korus et al. | |
| 2011/0168305 A1 | 7/2011 | Blau et al. | |
| 2012/0032971 A1 | 2/2012 | Hansen et al. | |
| 2012/0067441 A1 | 3/2012 | Korus et al. | |
| 2012/0080545 A1 | 4/2012 | Korus | |
| 2012/0096972 A1 | 4/2012 | Retsch | |
| 2012/0161511 A1 | 6/2012 | Brazier | |

FOREIGN PATENT DOCUMENTS

| | | |
|---|---|---|
| CA | 2 687 999 | 6/2010 |
| CA | 2 498 222 | 1/2012 |
| DE | 29 49 942 A1 | 6/1981 |
| GB | 605814 | 7/1948 |

(56) References Cited

FOREIGN PATENT DOCUMENTS

| GB | 764868 | 1/1957 |
|---|---|---|
| GB | 818976 | 8/1959 |
| JP | 55-39837 | 3/1980 |
| JP | 63-17187 | 1/1988 |
| JP | 4-8682 | 1/1992 |
| JP | 7-144668 | 6/1995 |
| JP | 10-218046 | 8/1998 |
| JP | 11-139358 | 5/1999 |
| JP | 2000-351388 | 12/2000 |
| JP | 3509729 B2 | 3/2004 |
| JP | 3659851 B2 | 6/2005 |
| SE | 189 170 | 4/1958 |
| SU | 1263573 A2 | 10/1986 |
| WO | WO-02/10007 A1 | 2/2002 |
| WO | WO-2005/113322 A1 | 12/2005 |
| WO | WO-2007/101632 A1 | 9/2007 |
| WO | WO-2008/073456 A2 | 6/2008 |
| WO | WO-2009/033052 A1 | 3/2009 |

OTHER PUBLICATIONS

Internet article entitled "Axle Replacement Tutorial", url: <http://web.archive.org/web/20051203111910/http://honda-tech.com/zerothread?id=382416>, Dec. 3, 2005.

United States Patent and Trademark Office, Complete Prosecution History of U.S. Appl. No. 12/519,007.

Dana Corporation, Spicer Off-Highway Systems Drivetrain Products Calalogue, Sep. 2005, pp. 1-11, Dana Corporation.

Ditch Witch RT115, HT115, RT95, RT75: RT/HT Tractors, Ditch Witch® Groundbreaking, www.ditchwitch.com, 12 pages, Jun. 10, 2006.

Ditch Witch RT55, RT40, RT36: RT Tractors, Ditch Witch® Groundbreaking, www.ditchwitch.com, 12 pages, Jun. 10, 2006.

Ditch Witch RT55 Trencher, http://web.archive.org/web/20070607131909/www.ditchwitch.com/dwcom/Equipment/Pr . . . , Copyright 2001, 4 pages.

Ditch Witch RT75 Trencher, http://web.archive.org/web/20070607112128/www.ditchwitch.com/dwcom/Equipment/Pr . . . , Copyright 2001, 5 pages.

Photographs of a Trencher (circa: 2000).

RT 1160 Ride-On Trencher, © 2007.

RT 1250 Hydrostatic Trencher/Plow, 2005.

Vermeer® RT1250 Tractor Parts Manual, Serial No. 101—Order No. 105400ZFH, Nov. 2005,298 pages.

Search Report mailed Oct. 2, 2008 relating to International Application No. PCT/US2007/025401, 3 pages.

* cited by examiner

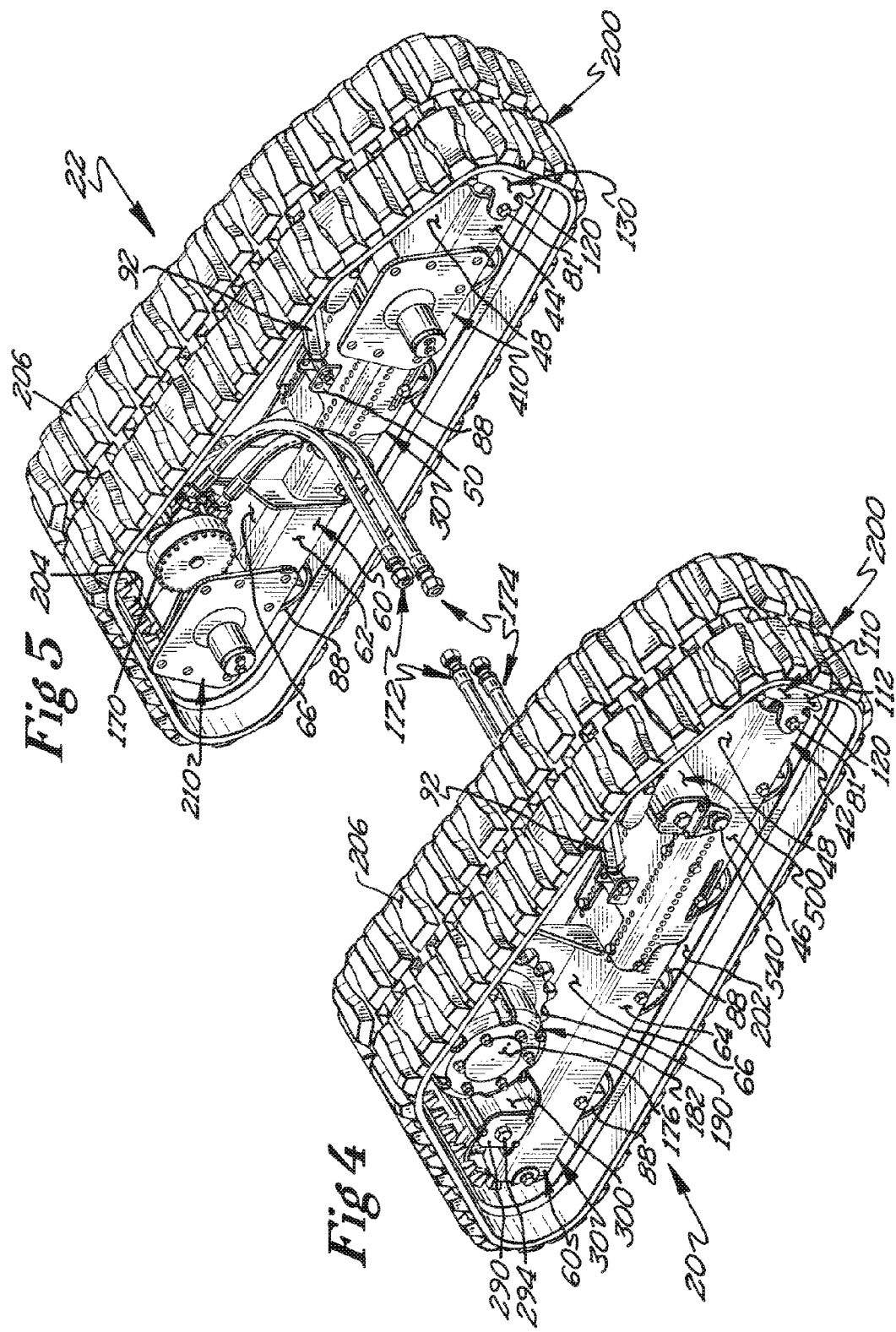

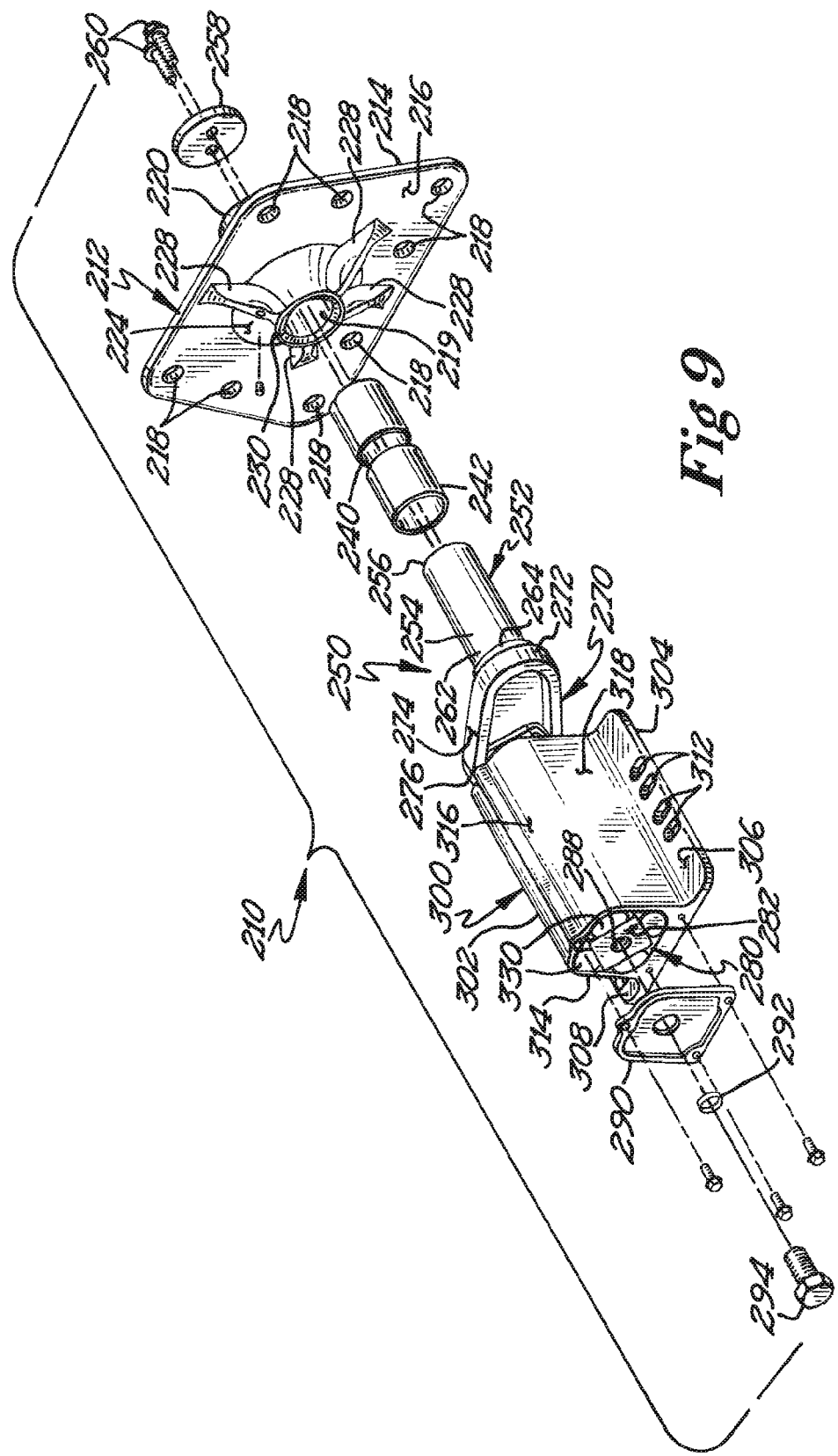

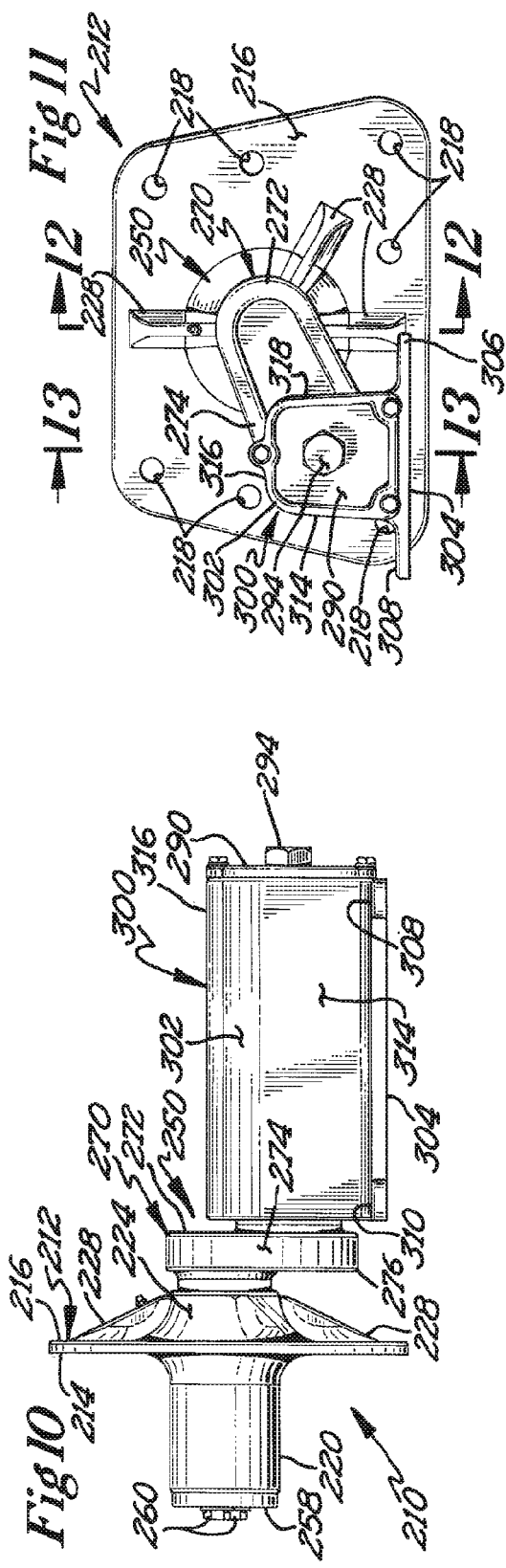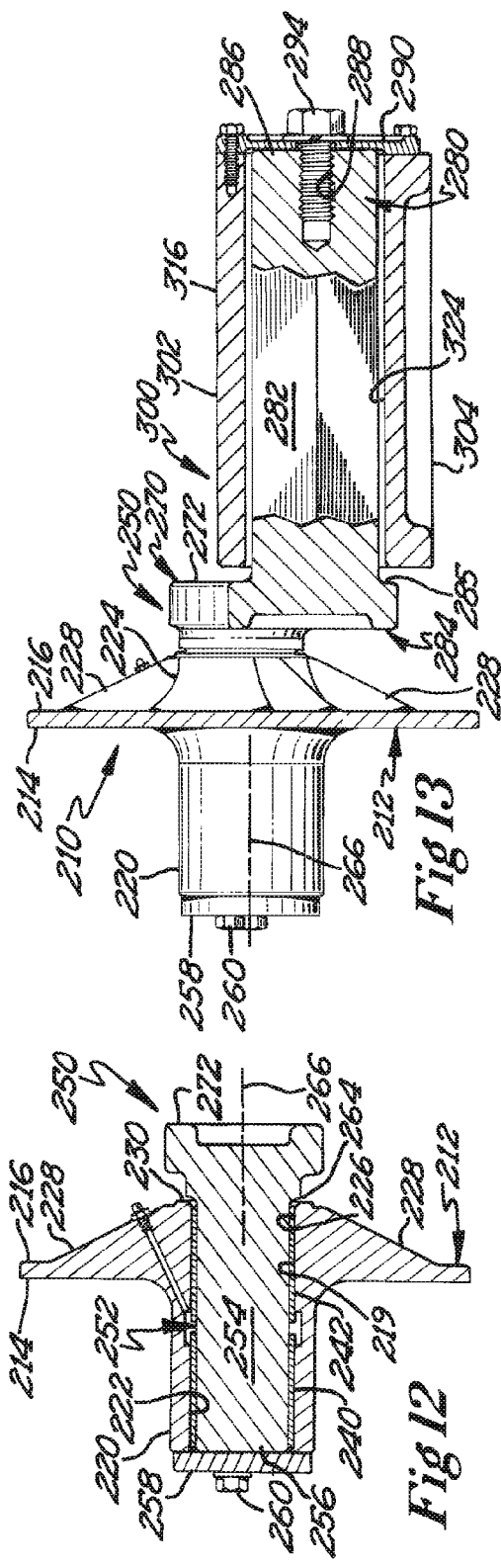

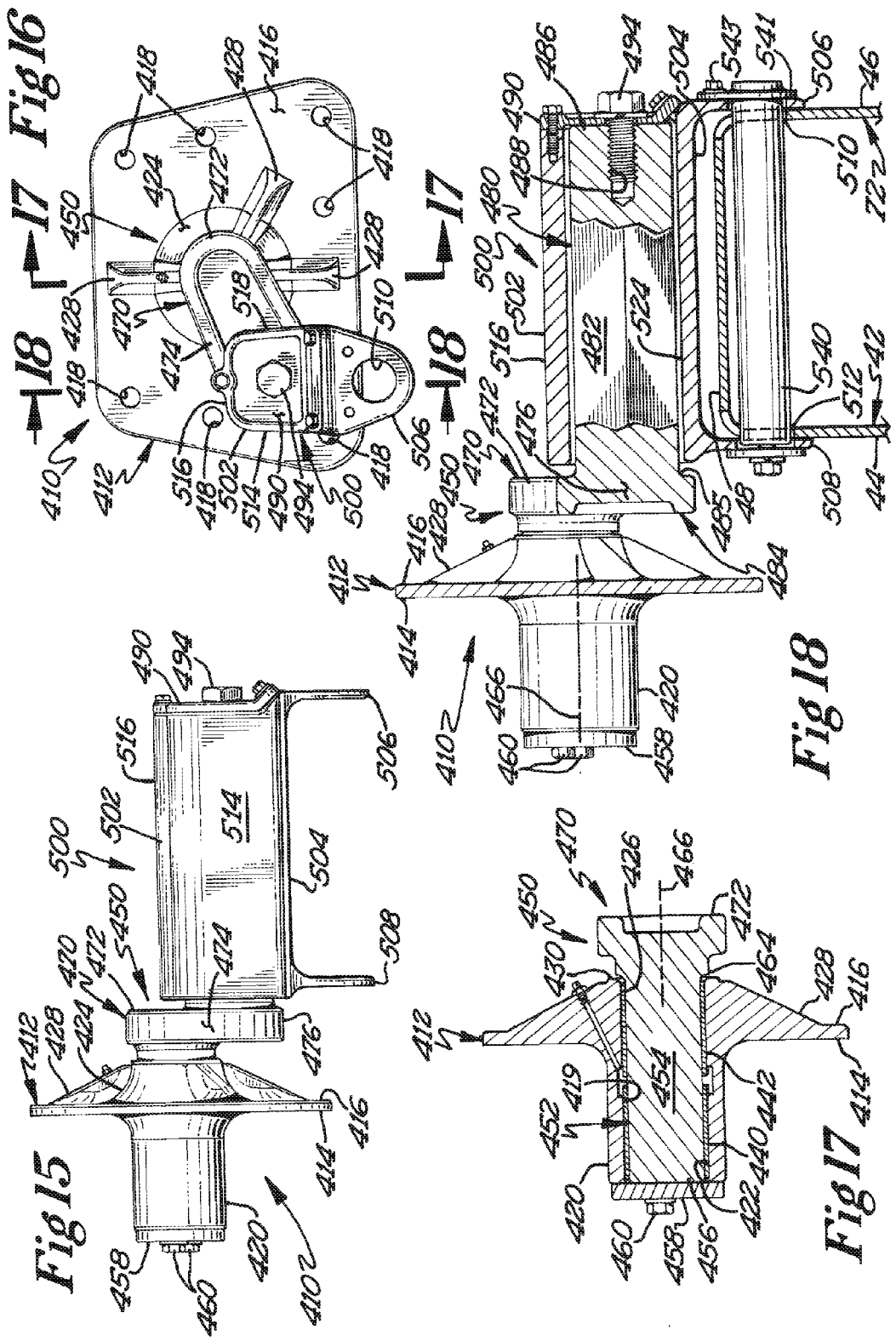

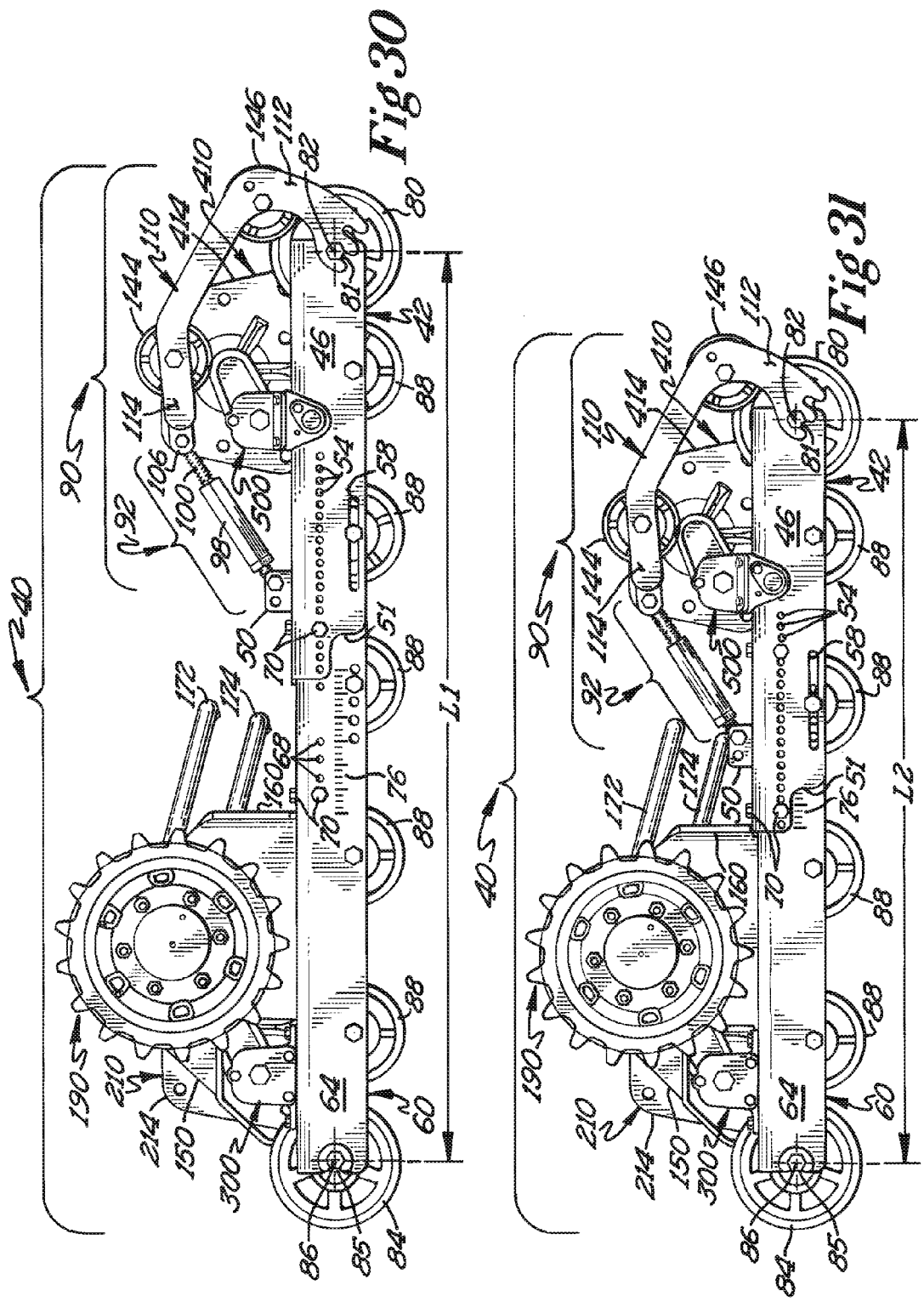

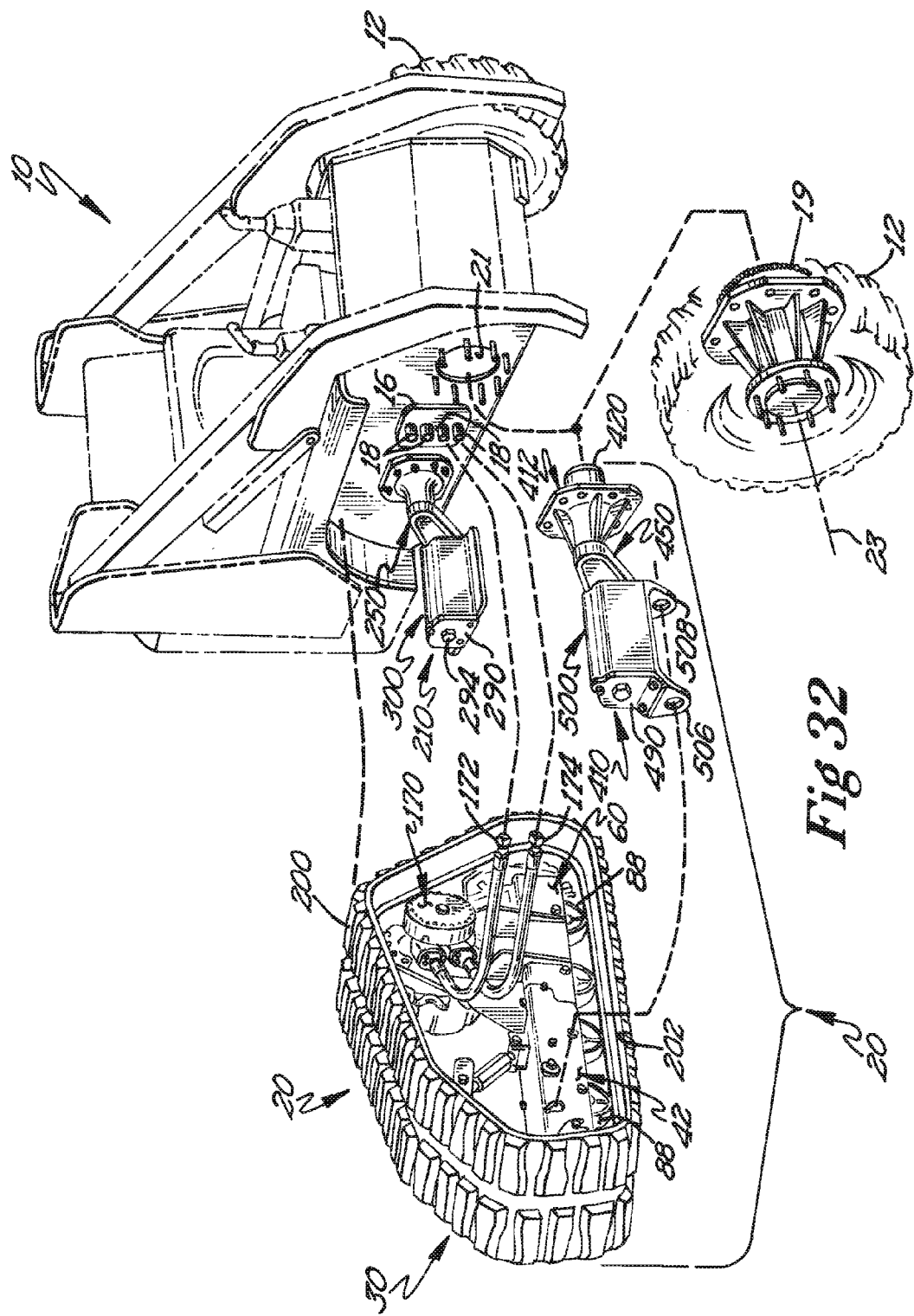

CONVERSION SYSTEM FOR A WHEELED VEHICLE

RELATED APPLICATIONS

The present application is continuation of U.S. application Ser. No. 12/519,007, filed Jul. 7, 2009, which is a 371 of international PCT/US2007/087296 filed Dec. 12, 2007, which claims benefit of U.S. provisional application Ser. No. 60/874,383 filed Dec. 12, 2006, all of which are hereby incorporated in their entirety herein by reference.

FIELD OF THE INVENTION

The present invention relates generally to wheeled vehicles. More particularly, the present invention relates to a track assembly that may be used to convert construction equipment such as wheeled skid-steer loaders into tracked skid-steer loaders.

BACKGROUND OF THE INVENTION

Skid-steer loader machines are old and well known to the art. Originally designed to operate with only a loading scoop or a bucket, these machines have, with the provision of specifically designed attachments, evolved into multi-purpose machines capable of many diverse operations. Nowadays, a typical skid-steer loader machine may be configured to operate as a street sweeper, a posthole digger, a trencher, or a forklift, for example. As the number of applications of skid steer loaders increases, they may be found in use in many different environments. Often, they are used in conditions where the surface upon which they traverse is less than ideal. The present invention addresses limitations associated with existing skid-steer loaders.

SUMMARY OF THE INVENTION

A plurality of track assemblies for converting a wheeled vehicle into a tracked vehicle. Generally, each track assembly has a longitudinally adjustable support frame having a removably attachable motive source with an attachable drive sprocket, a plurality of support rollers, a tensioning assembly, and an endless track that encircles the support frame, its rollers, and the sprocket to which it is drivingly engaged. Each track assembly is connected to a vehicle by rear and front mounting assemblies, which are preferably articulated and resiliently biased to provide the assembly, and the vehicle to which it is attached, with a dynamic suspension. More specifically, each support frame comprises first and second elongated, inverted U-shaped sections that may be telescopically adjusted relative to each other so that the length of the track assembly can be varied to accommodate vehicles having different wheel base lengths. The motive source, to which a drive sprocket is attached, is secured to an attachment bracket that is attached to the support frame, preferably on the top wall of the second or rearwardmost U-shaped section. As will be appreciated, the motive source size and output may be customized to a particular vehicle's operational requirements. The motive source of each track assembly is connected to and controlled by the same control lines that were previously connected to each respective internal drive unit. The frame includes a front roller, a rear roller and a plurality of intermediate rollers (or bogeys) all of which are rotatably mounted between the side walls of the inverted U-shaped sections so that they partially extend below the bottom edges thereof. In addition, the front and rear rollers are mounted so that they also partially extend beyond the front and rear ends of the respective U-shaped section to which they are mounted. The tensioning assembly is in the form of a movable framework that is pivotally connected to the first or forwardmost U-shaped section. Preferably, the framework comprises generally parallel first and second arms with first and second ends, with the first ends connected to each other by a transverse connecting bar, and the second ends pivotally connected to the first U-shaped section. A plurality of idler rollers is rotatably mounted between the first and second arms so that they are in a position to rollingly contact an endless track. The position of the idler rollers, relative to the support frame, can be changed by rotating the framework about its pivot point(s) and securing that position with a tensioning apparatus that is connected between the transverse connecting bar of the framework and the first U-shaped section. The tensioning assembly can be adjusted to ensure that the track properly engages the front roller, the rear roller and the sprocket. The tensioning assembly can also accommodate for changes in the circumference of the track due to normal wear and tear. Each mounting assembly includes a first attachment member, a link, and a second attachment member, with the first attachment member configured to be removably attached to a position on a vehicle where a wheel axle attached to an internal drive unit would normally reside but which has been disconnected from its control lines and removed, with the second attachment member configured to be connected to the support frame, and with the link operatively connecting the first attachment member to the second attachment member. At least one portion of the line is operatively connected to its respective attachment member by a torsional bushing. Preferably, the torsional bushing system comprises a square tube into which a square shaft and a plurality of resilient elements are positioned. In operation, when the shaft rotates relative to the tube, the resilient elements are compressed and rotation is prevented.

An object of the present invention is to provide a track assembly that can be used to convert a wheeled vehicle into a tracked vehicle.

Another object of the invention is to increase the handling and stability of a wheeled vehicle.

A feature of the present invention is that the track assembly is able to accommodate wheeled vehicles having different wheelbase lengths.

Yet another feature of the present invention is that installation is non-permanent and reversible.

An advantage of the present invention is that the track assembly can be transferred from one vehicle to another vehicle.

Another advantage of the invention is that traction and stability are increased by effectively lengthening the wheelbase of a vehicle.

Another advantage of the invention is that traction and stability are increased by providing the vehicle with an independent front suspension system.

These and other objectives and advantages of the invention will appear more fully from the following description, made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

DESCRIPTION OF THE DRAWINGS

FIG. 4 is a perspective view of the right track assembly of FIG. 2 taken from a point in front of and to the right, which show the outside of the track assembly;

FIG. 5 is a perspective view of the left track assembly of FIG. 2 taken from a point in front of and to the right, which show the inside of the track assembly;

FIG. 9 is an exploded perspective view of the rear mounting assembly of the track assembly;

FIG. 10 is a side view of the rear mounting assembly of the track assembly;

FIG. 11 is an end elevational view of the rear mounting assembly of the track assembly;

FIG. 12 is a cross-sectional view of the rear mounting assembly of the track assembly;

FIG. 13 is a cross-sectional view of the rear mounting assembly of the track assembly;

FIG. 15 is a side elevation view of the front mounting assembly of the track assembly;

FIG. 16 is an end elevation view of the front mounting assembly of the track assembly;

FIG. 17 is a cross-sectional view of the front mounting assembly of the track assembly;

FIG. 18 is a cross-sectional view of the front mounting assembly of the track assembly;

Figures 27, 28:
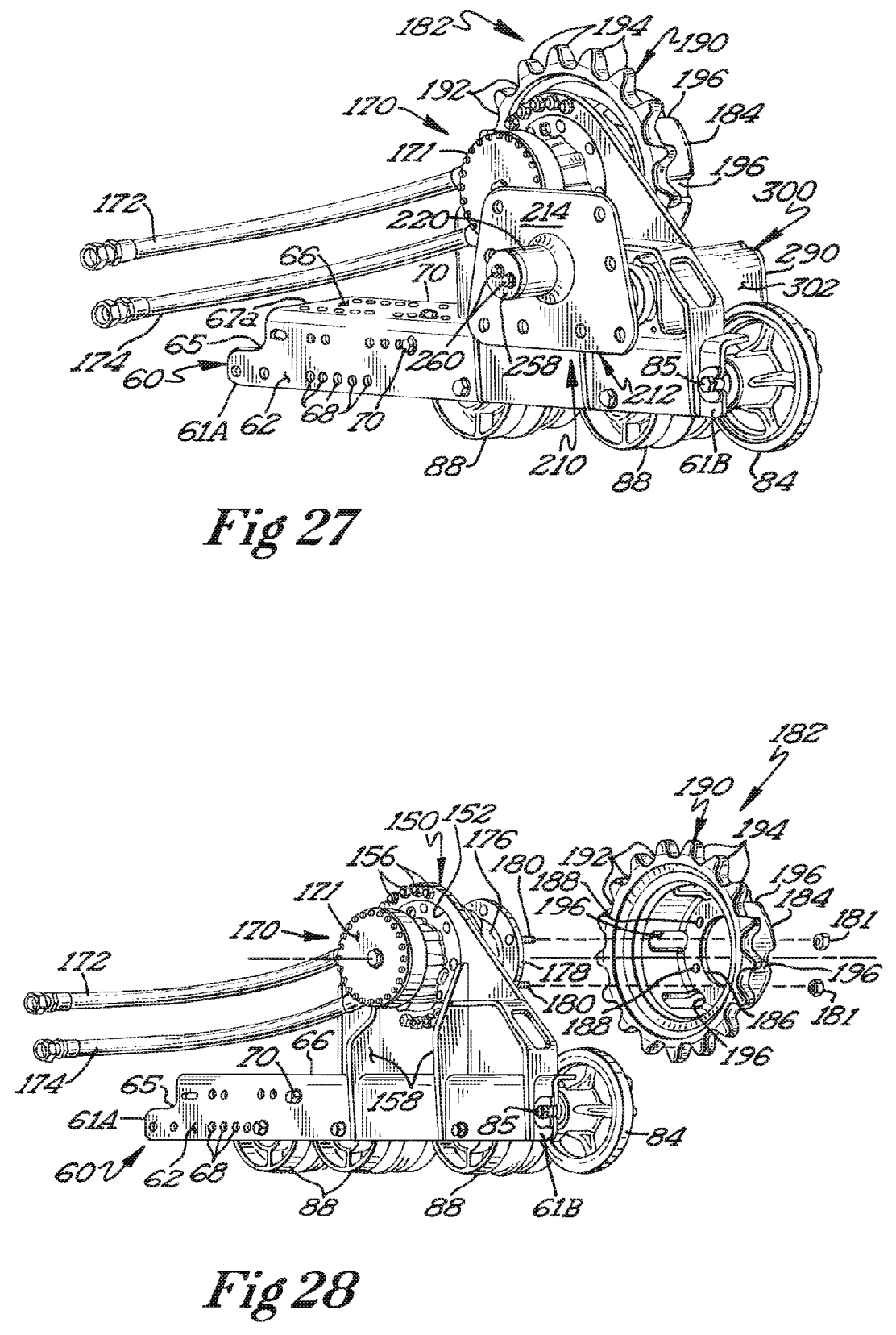

FIG. 27 is a partial, perspective view, taken from the rear and to the left of the right track assembly, showing the attachment bracket, motive source, sprocket, and rear mounting assembly as they are attached to the rear section of the support frame;

FIG. 28 is a partial, perspective, exploded view, taken from the rear and to the left of the right track assembly, showing the attachment bracket and motive source as they are attached to the rear section of the support frame, and with the sprocket in an exploded position;

FIG. 30 is a partial, side elevational view of the right track assembly showing the adjustments for different wheel base lengths;

FIG. 31 is a partial, side elevation view of the right track assembly showing the adjustments for different wheel base lengths;

FIG. 32 is a partial perspective view of a partially converted skid steer vehicle;

DETAILED DESCRIPTION

Figure 1:
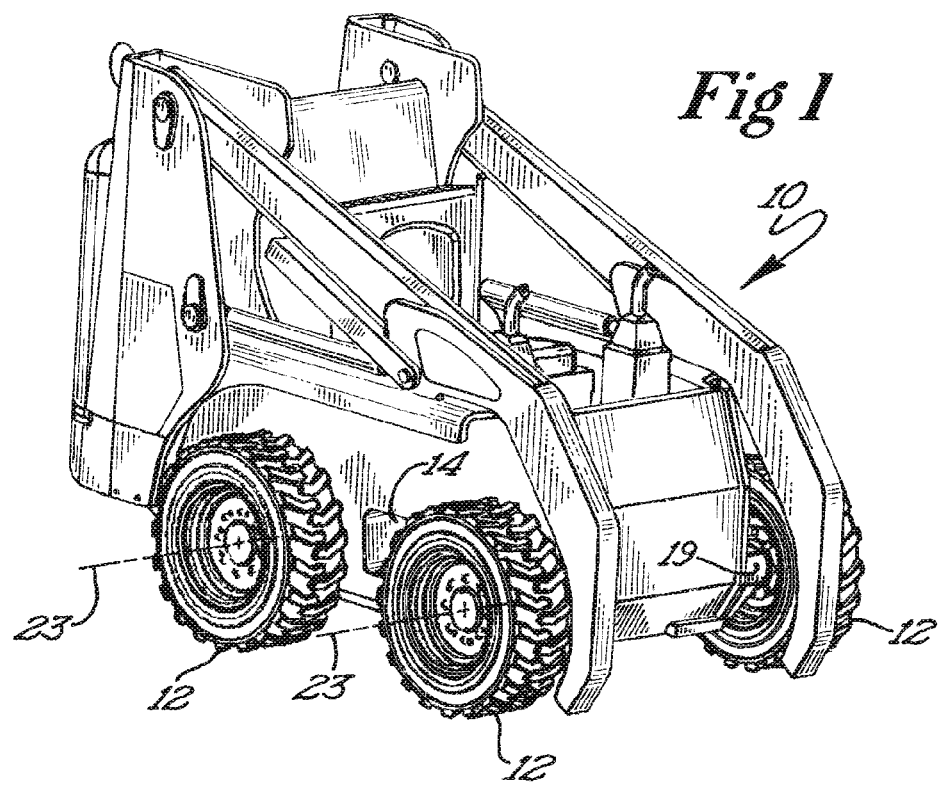
FIG. 1 is a perspective view of a skid-steer vehicle before it has been converted into a tracked vehicle.
Figure 2:
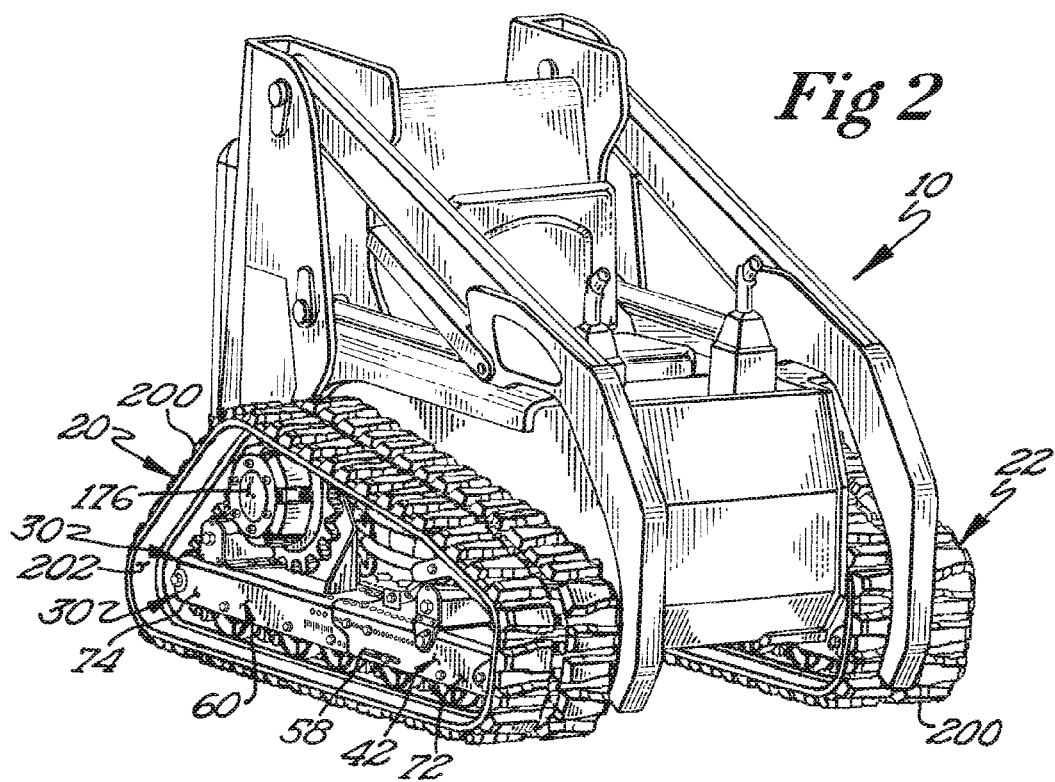
FIG. 2 is a perspective view of a skid-steer vehicle after it has been converted into a tracked vehicle.
Figure 3:
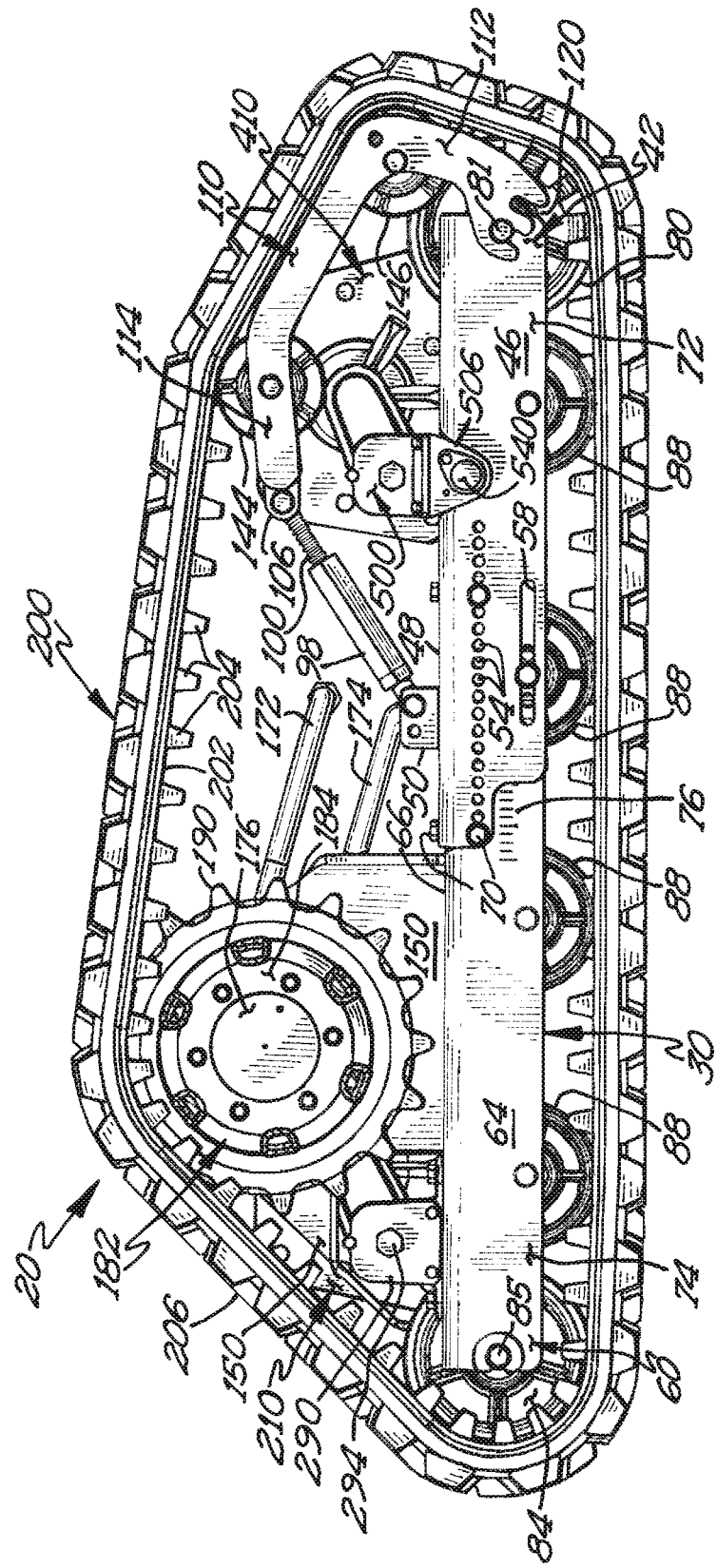
FIG. 3 is a side elevational view of a right side track assembly shown in FIG. 2.
Figure 6:
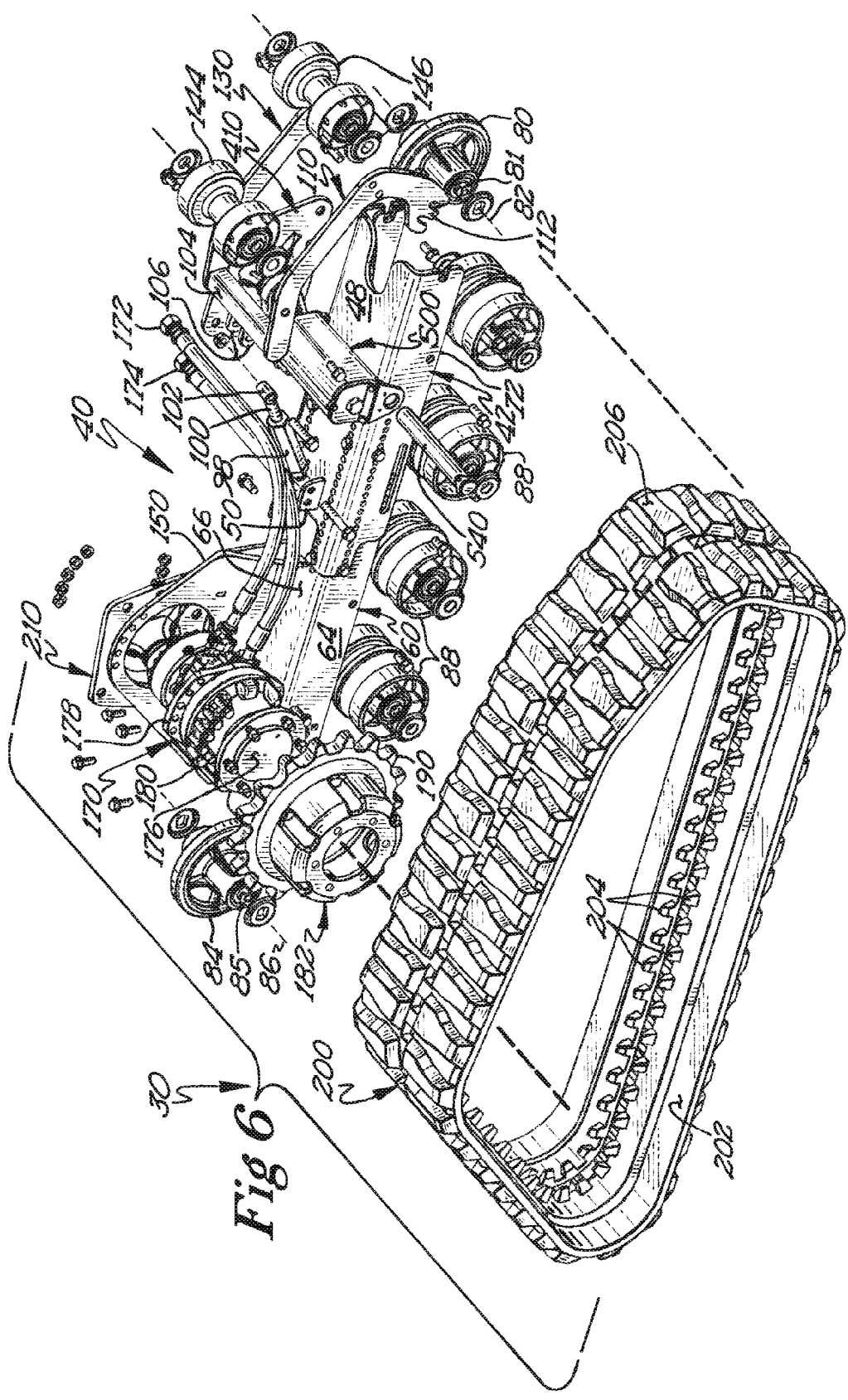
FIG. 6 is an exploded view of the track assembly taken from point to the right thereof.
Figure 7:
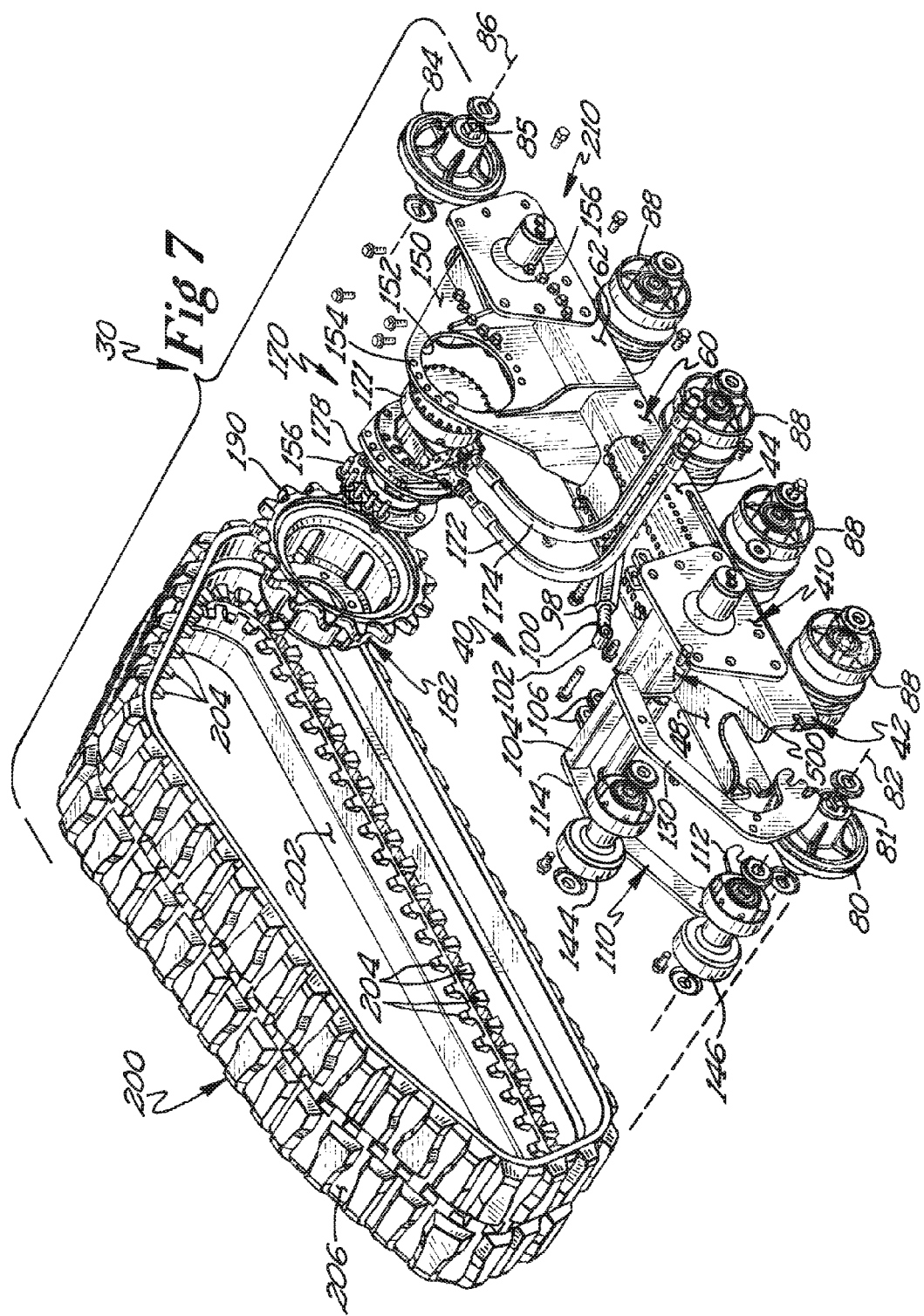
FIG. 7 is a perspective view of the right track assembly taken from a point to the left thereof.
Figure 8:
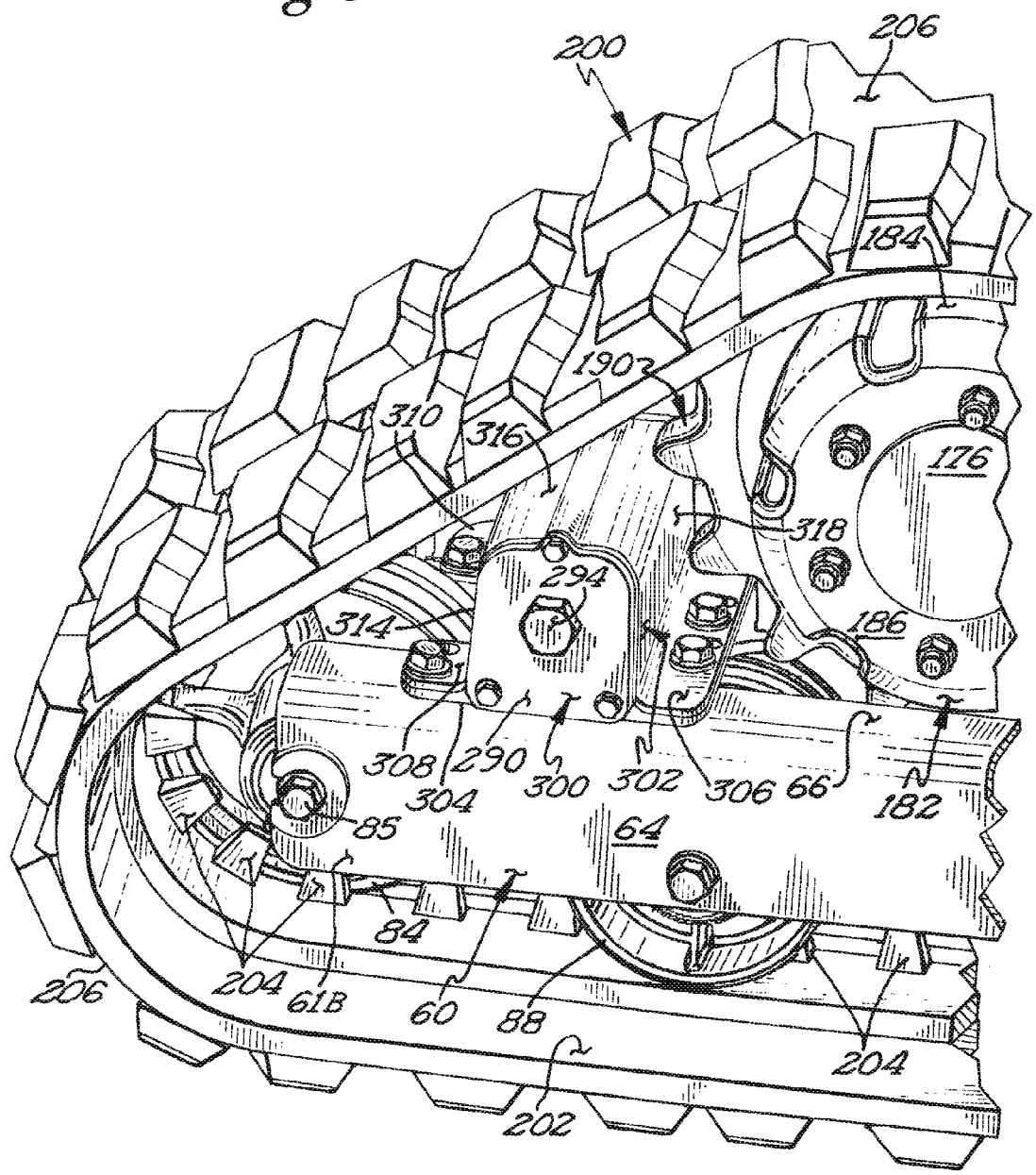
FIG. 8 is a perspective view of the housing of the rear mounting assembly as it is attached to the support frame of the track assembly.
Figure 14:
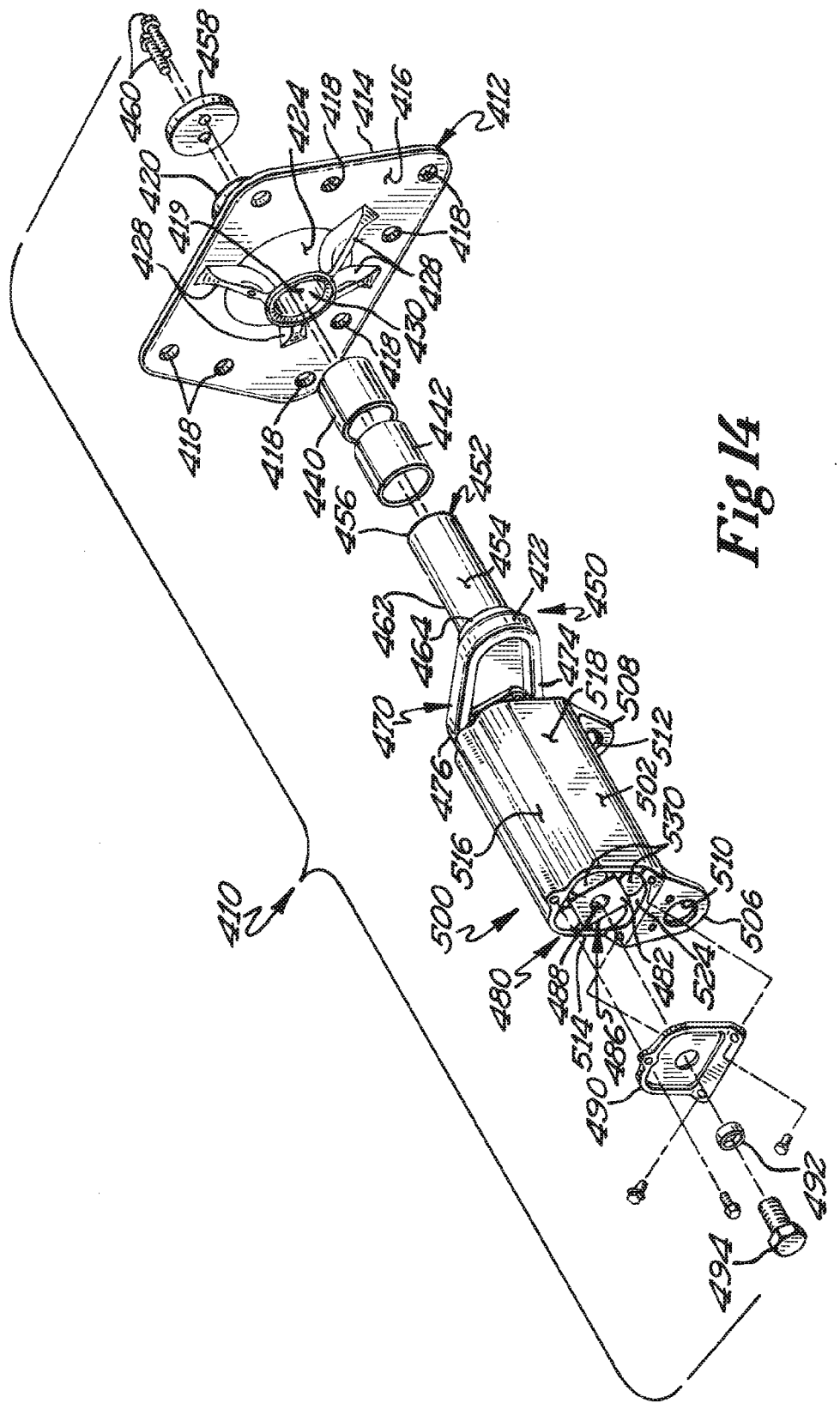
FIG. 14 is an exploded perspective view of the front mounting assembly of the track assembly.
Figure 19:
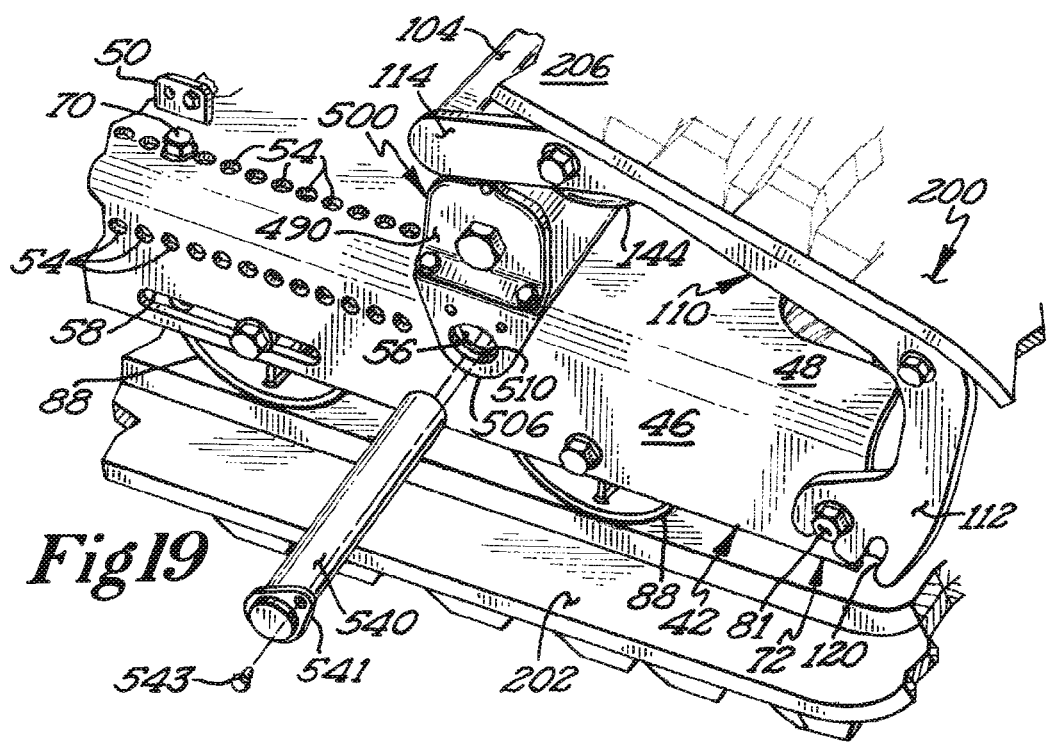
FIG. 19 are exploded perspective view of the housing of the front mounting assembly as it is connected to the support frame of the track assembly.
Figure 20:
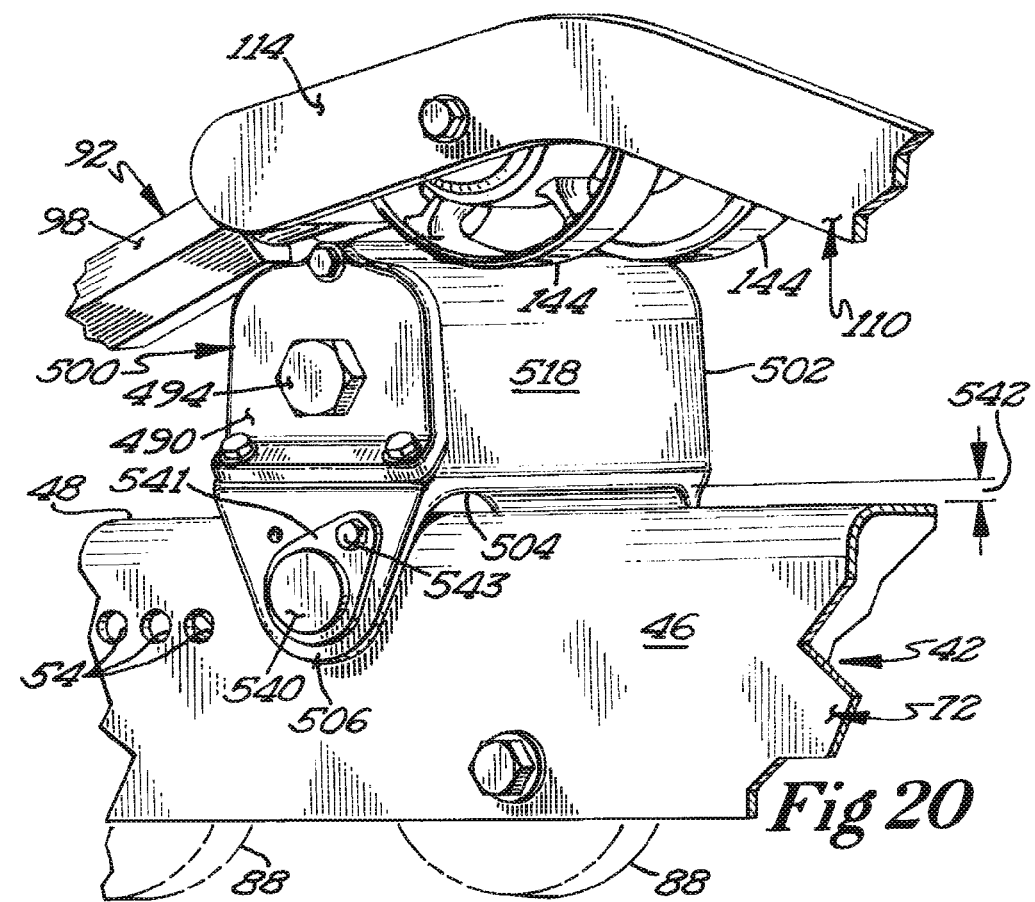
FIG. 20 is a perspective view of the housing of the front mounting assembly as it is connected to the support frame of the track assembly.
Figure 21:
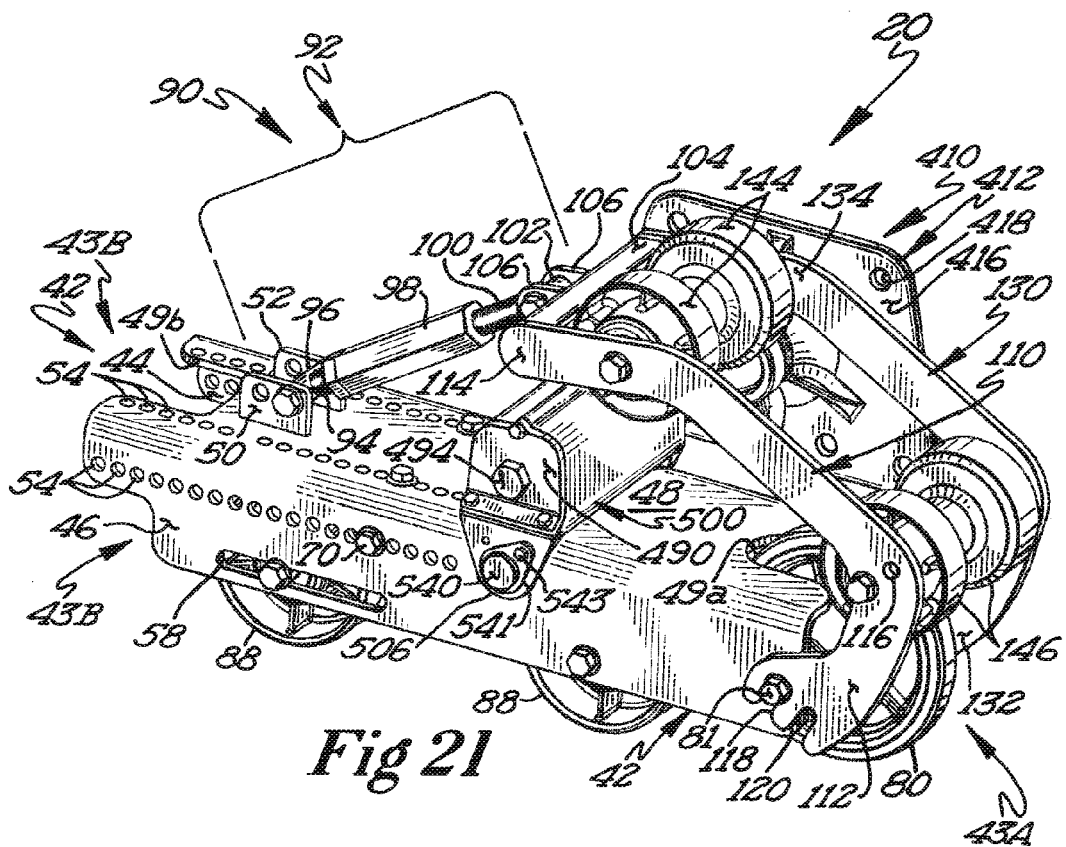
FIG. 21 is a partial, perspective view of the tensioning assembly and the front mounting assembly as they are connected to the front section of the support frame.
Figure 22:
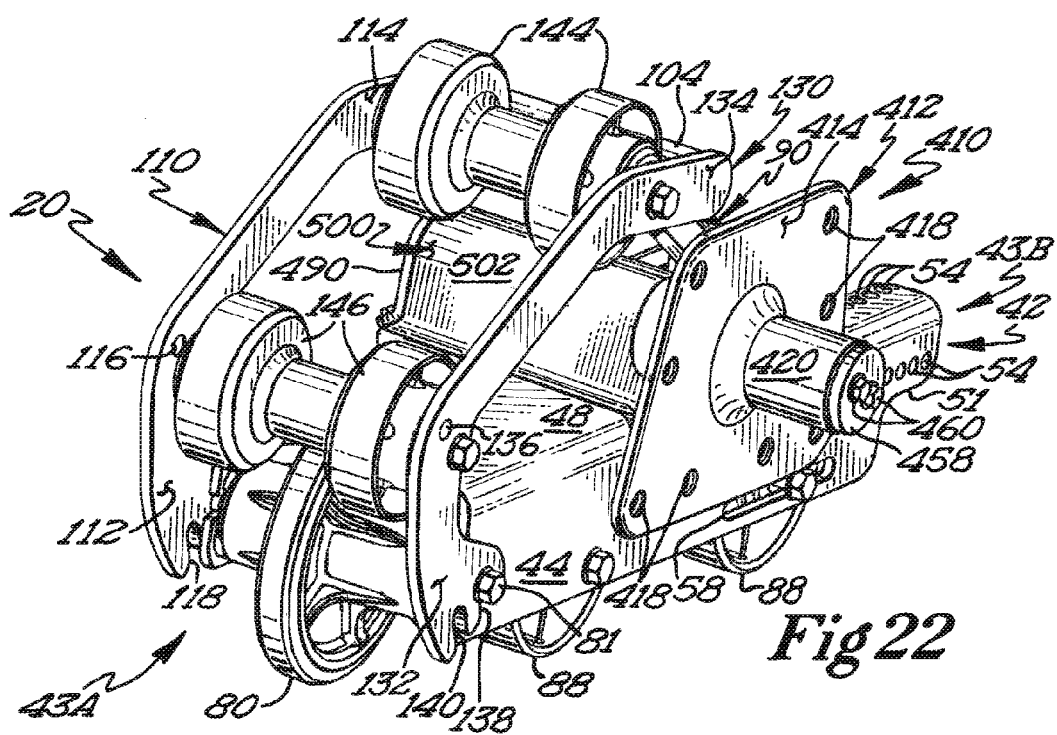
FIG. 22 is a partial, perspective view of the tensioning assembly and the front mounting assembly as they are connected to the front section of the support frame.
Figure 23:
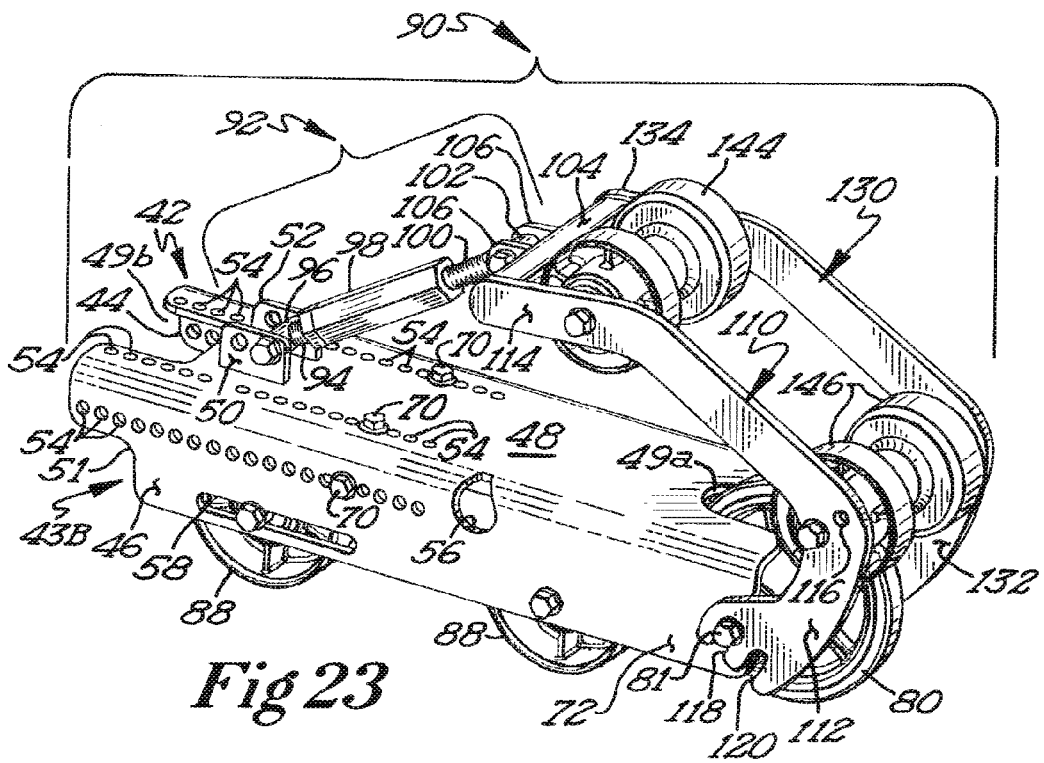
FIG. 23 is a partial, perspective view of the tensioning assembly as connected to the front section of the support frame.
Figure 24:
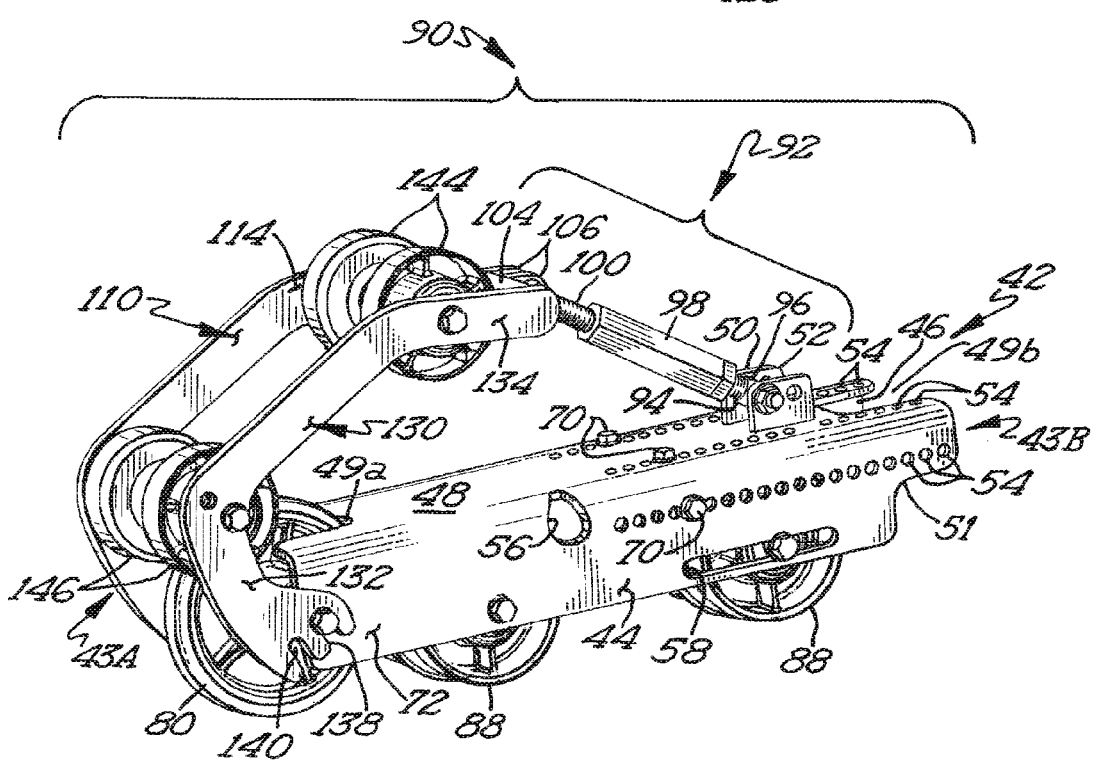
FIG. 24 is a partial, perspective view of the tensioning assembly as connected to the front section of the support frame.
Figure 25:
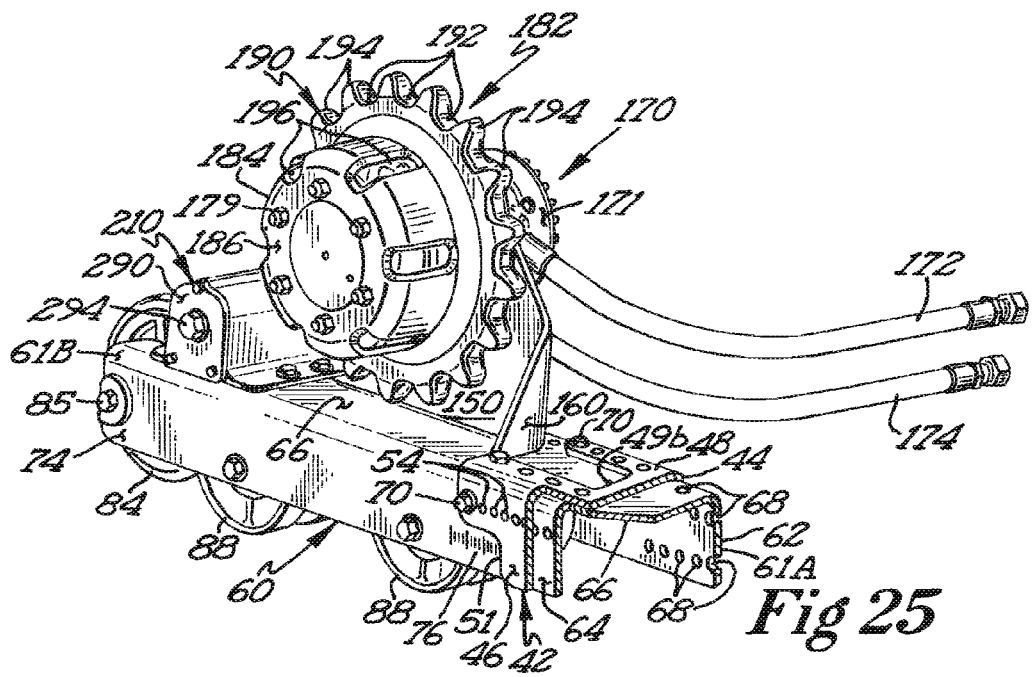
FIG. 25 is a partial, perspective view, taken from the front and to the right of the right track assembly, showing the attachment bracket, motive source, sprocket, and rear mounting assembly as they are attached to the rear section of the support frame.
Figure 26:
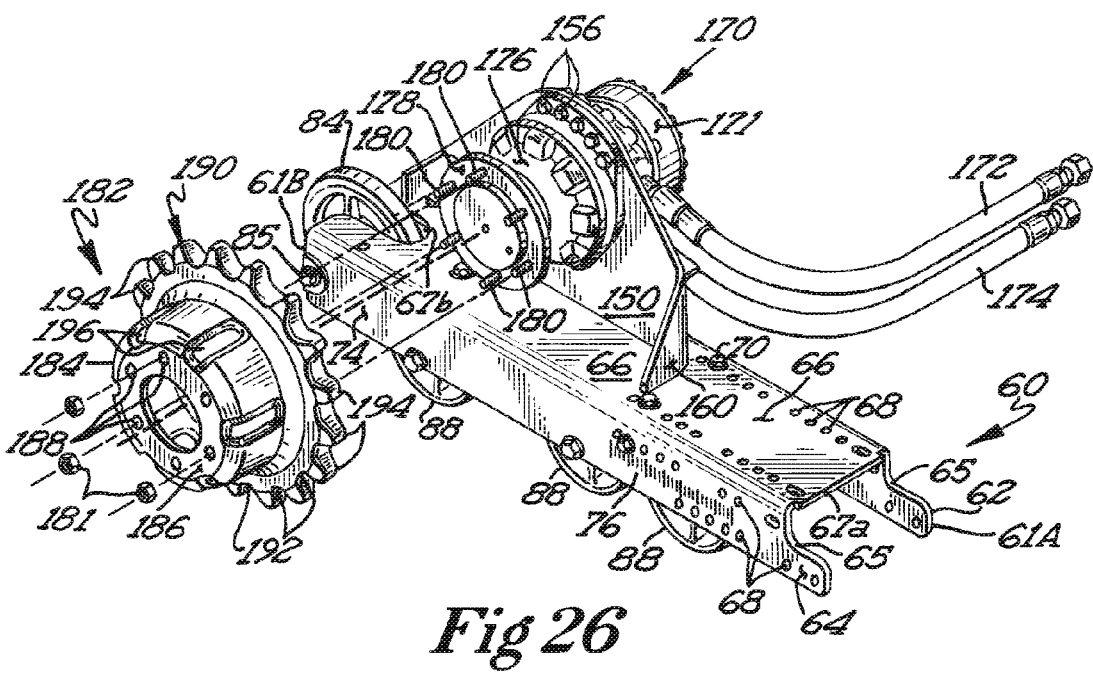
FIG. 26 is a partial, perspective, exploded view, taken from the front and to the right of the right track assembly, showing the attachment bracket and motive source as they are attached to the rear section of the support frame, and with the sprocket in an exploded position.
Figure 29:
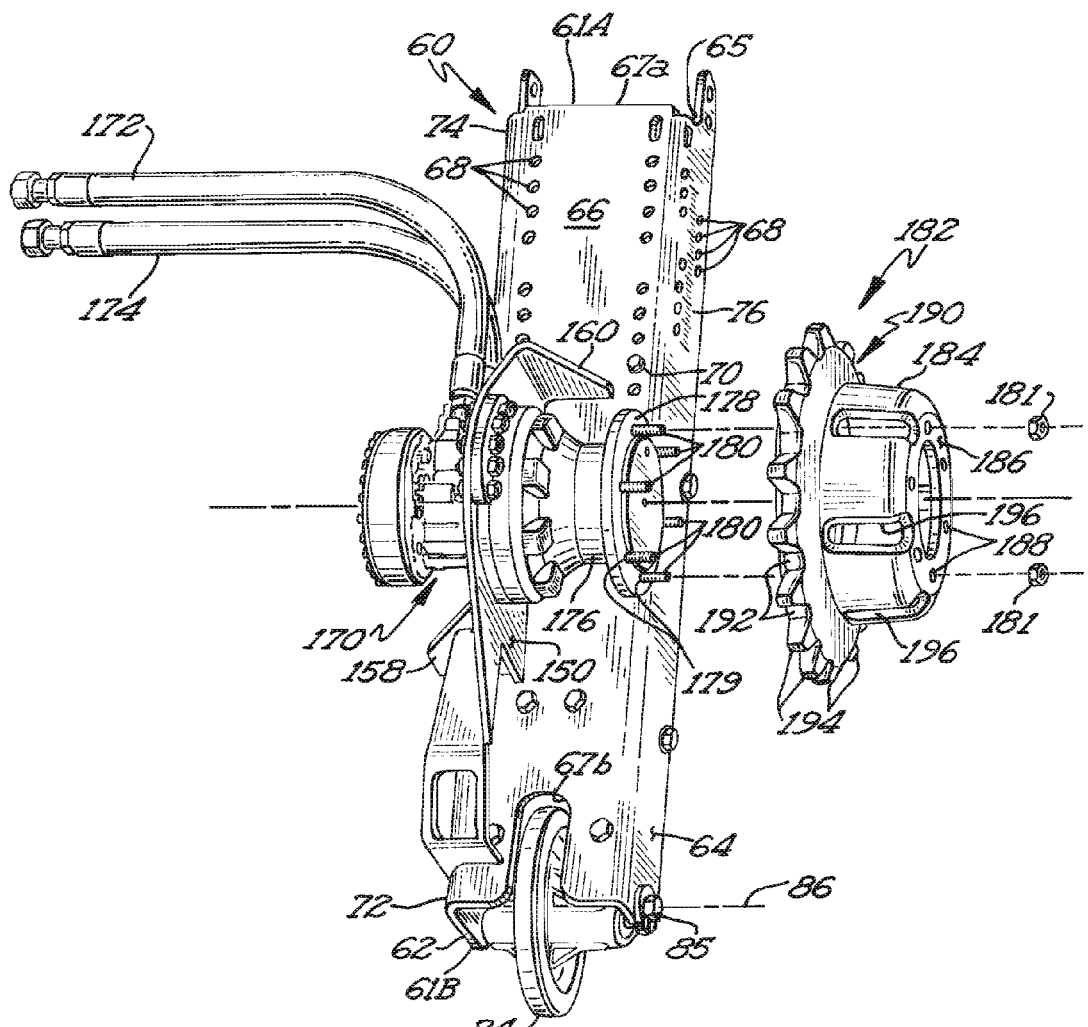
FIG. 29 is a partial, perspective, exploded view, taken from the rear and above the right track assembly, showing the attachment bracket and motive source as they are attached to the rear section of the support frame, and with the sprocket in an exploded position.

A generic skid-steer vehicle 10 having a plurality of drive wheels 12 and an access port 14 that is normally covered by a protective panel is shown in FIG. 1, and a skid-steer vehicle 10 that has been provided with right and left wheel converters 20, 22 is depicted in FIG. 2. As better illustrated in FIGS. 3-8, generally, each wheel converter 12 comprises a track assembly 30 and a pair of mounting assemblies 210, 410. And, each track assembly 30 comprises a frame 40, support rollers 80, 84, 88, a tensioning assembly 90, a motive source 170 and an elongated track 200. More specifically, the frame 40 comprises first and second elongated, inverted U-shaped sections 42, 60 (see, for example, FIGS. 21 and 25). Each section 42, 60 has first and second ends 43A, 43B and 61A, 61B, respectively, and is defined by an inner side wall 44, 62, an outer side wall 46, 64 and a top wall 48, 66. The first and second sections 42, 60 are configured and arranged so that the first end 43A, 61A of one may be received within the second end 43B, 61B of the other in a partial nesting relation. The first and second sections 42, 60 are also configured to be longitudinally adjustable relative to each other to enable the track assembly 30 to be used with different makes and models of skid-steer vehicles having various wheel base lengths. To that end, the inner side walls 44, 62, outer side walls 46, 64, and the top walls 48, 66 of the sections 42, 60 are provided with a plurality of apertures 54, 68 through which fastening elements 70, such as bolts, may be inserted and secured with and lock washers and nuts (not shown). Markings or indicia 76 are provided on the outer side walls 46, 64 of the first and second sections 42, 60 to facilitate frame length adjustment. Preferably, the frame sections 42, 60 can be adjusted to accommodate vehicles having wheel base lengths in the range of about 72 to about 30 inches (190 to 72 cm) (see, for example, "L-1" and "L-2" in FIGS. 30 and 31). Preferably, the two frame sections 42, 60 can telescope relative to each other, but it will be appreciated that other configurations are possible and within the scope of this invention. For example, it is envisioned that the support frame could comprise two elongated sections that are adjustably attached to each other by a third, center section (not shown).

The first and second sections 42, 60 of the frame 40, though similar, are not identical. As depicted in FIGS. 21-24, the first end 43A of the first section 42 includes a forwardly opening cutout 49A in the top wall 48 that is configured to receive portion of a front (or forwardmost) roller 80 so that it may freely extend above the top wall 48 of the frame 42. The first section 42 includes a plurality of intermediate rollers or bogeys 88 that are rotatably retained between the inner and outer side walls 44, 46. Note that one of the intermediate rollers 88 is rotatably retained in longitudinal slots 58 in the inner and outer side walls 44, 46 so that its position may be adjusted or customized for a particular vehicle. The first section 42 also includes a pair of vertically extending, multiple apertured flanges 50, 52 that are located on the top wall 48 and which are configured to rotatably retain a portion of a tensioning assembly 90, which will be discussed later. In addition, the first section 42 also includes a pair of apertures 54 in the inner and outer side walls 44, 46 that are configured to receive a pivot pin 56 that is used to connect a front mounting assembly 410 thereto. The second end 43B of the first section 42 includes a rearwardly opening cutout 49B in the top wall 48 and notches 51 in the lower half of the inner and outer side walls 44, 46, with the cutout and notches configured to provide clearance for components of the frame 60 when the frame 40 length "L" is adjusted (see, "L-2" of FIG. 31). As shown, cutout 49B is configured so that it can accommodate a forward portion of the motive source attachment bracket 150 of the second frame section 60, when the two U-shaped frame sections 42, 60 are collapsed together as shown in FIG. 31. In addition, notches 51 of frame section 42 cooperate with the indicia 76 on side wall(s) 64 of frame section 60 to facilitate adjustment of the U-shaped frame sections 42, 60 to a particular, predetermined length.

As shown in FIGS. 25-29, the second U-shaped frame section 60 includes first and second ends 61A, 61B, with the first end 61A having a cutout 67A in the top wall 66 that is in communication with notches 65 in the upper half of the inner and outer side walls 62, 64. The second end 61B of the second section 60 includes a rearwardly opening cutout 67B in the top wall 66 that is configured to receive a portion of the rear (or rearwardmost) roller 84 so that it may freely extend above the top wall 66 of the frame 40. The second section 60 is provided with a plurality of intermediate rollers or bogeys 88 that are rotatably retained between its inner and outer side walls 62, 64. The second section 60 includes an attachment bracket 150 that is attached thereto, and which is configured to receive and retain a motive source 170 (preferably a hydraulic motor having a range of between 20 to 120 horsepower). To that end, the attachment bracket 150 is provided with a central through hole 152 that can receive the body 171 of the motive source 170, and a plurality of attachment apertures 154 about the periphery of the through hole 152. The attachment apertures 154 are arranged to coincide with attachment apertures in opposing flanges of a motive source 170, and the aligned apertures are configured to be used in conjunction with fastening elements 156 (such as nuts and bolts) so as to secure the motive source 170 to the attachment bracket 150. Preferably, the attachment bracket 150 is attached to the top wall 66 of the frame 40 so that it positions the motive source 170 above the top wall 66 of the frame 40. More preferably, the attachment bracket 150 is provided with plates 158 and gussets 160 that extend between to the frame 40 and which provide reinforcement therefore.

While the motive source could be, for example, an electric motor, an internal combustion engine or a hybrid engine, the preferred motive source is a hydraulic motor. Preferably, the motive source 170 will have a displacement in the range of about 30 to 140 horsepower. Normally, there would be four conduits that are used to connect each motive source to the vehicle to which it is attached. However, as depicted, only two drive conduits, 172, 174 are shown. Additional conduits such as the motive source pressure relief conduit and the brake release conduit have been omitted to facilitate a clearer understanding of the invention. However, it will be understood that all of the conduits will be connected to the vehicle so that vehicle controls will be able to operate as close to normal as possible. Preferably, each motive source 170 includes an outwardly extending hub 176 with a flange 178 that includes a plurality of threaded apertures 179 spaced thereabout to which outwardly extending threaded bolts 180 are attached. A track engagement device 182 is attached to the flange 178 of the motive source 170 using fastening elements, such as threaded bolts 180 and nuts 181. The track engagement device 182 has a generally cylindrically shaped body 184, with one end having an inwardly extending flange 186 with apertures 188 and with the other end of the body 184 having an outwardly extending flange or track receiving surface 192 that includes a plurality of radially extending projections or teeth 194 that are configured to drivingly engage an endless track 200. The body 184 may be provided with longitudinal holes 196 to reduce the weight of the track engagement device 182.

With regard to FIGS. 3-7, first and second rollers 80, 84 are operatively connected adjacent opposing ends 72, 74 of the support frame 40 by shafts 81 and 85, respectively, and serve to support the vehicle 10 and to define the ground contacting extent of the external surface 206 of the endless track 200. The first and second rollers 80, 84 also redefine the wheelbase of the vehicle 10. Note the rotational axes 82, 86 of the first and second rollers 80, 84 are spaced from each other by a distance that is greater than the distance between the rotational axes 23 (see FIG. 1) of the wheel axle housings 19 of a vehicle prior to installation of the track assembly 30. As will be appreciated, this increases the stability and handling characteristics of the vehicle.

Now also referring in addition to FIGS. 21-24, a tensioning assembly 90 is operatively connected to the first section 42 of the support frame 40. Generally, the tensioning assembly 90 includes a tensioning apparatus 92 (turnbuckle) and a pair of spaced apart, generally arcuately shaped arms 110, 130. Each arm 110, 130 has a first end 112, 132 and a second end 114, 134, with the first end 112, 132 configured to be pivotally connected to the ends of a shaft 81 upon which the forwardmost roller 80 is rotatably mounted. Note that the first end 112, 132 of each arm 110, 130 is provided with a pair of slots 118 and 120, 138 and 140 that enable the arms 110, 130 to be adjusted to a second pivot point, as needed. The second ends 114, 134 of the arms 110, 130 are connected to each other by a transverse bar 104 that has a pair of flanges 106 to which a portion of the tensioning apparatus 92 is attached. The second ends 114, 134 of the arms 110, 130 may be moved relative to the frame 40 by adjusting the tensioning apparatus 92. The tensioning apparatus 92 comprises a first threaded shaft 94 that is attached to a transverse member 96, which is pivotally connected to flanges 50, 52 extending from the top wall 66 of the frame 40; an adjustment member 98 (or turnbuckle); and a second threaded shaft 100 that is attached to a second transverse member 102 that is pivotally connected to the flanges 106 that extend from the transverse bar 104 that connects the second ends 114, 134 of the arms 110, 130 to each other. The arcuately shaped arms 110, 130 are configured and arranged to rollingly support two upper idler rollers 144, 146 that are configured to engage the endless track 200 so that it is spaced from the housing 302 of the front mounting assembly 410 in a non-contacting relation. Preferably, the arms 110, 130 of the tensioning assembly 90 impart a forward slant to the endless track 200 so that it is better able to negotiate vertical obstacles. Note that the first and second rollers 80, 84 are configured to ride between parallel rows of guide teeth 204 on the interior surface 202 of the endless track 200, while the intermediate 88 and idler rollers 144, 146 are configured to straddle the parallel rows of guide teeth 204.

Now also referring to FIGS. 9-18, each track assembly 30 is removably connected to a vehicle 10 by rear and front mounting assemblies 210, 410, each of which includes a first attachment member 212, 412, a link 250, 450, and a second attachment member 300, 500, respectively. Generally, each first attachment member is configured and arranged to be attached to a vehicle whose internal drive motor has been removed. Each attachment member has an aperture that is configured and arranged to receive a section of a link. Each link is generally in the form of a crank with parallel sections, with the sections of the crank offset from each other and extending in opposite directions from each other, relative to a connecting arm. Each second attachment member is connected to respective rear and front U-shaped frame sections and is configured to receive the parallel section of the link. In operation, one of the parallel sections of the link can freely rotate, while the other parallel section's rotational movement is resisted.

The rear mounting assembly 210 will now be discussed. The first attachment member 212 of the rear mounting assembly 210 has a first surface 214, a second surface 216, and a plurality of apertures 218 that are configured to have the bolt pattern of the particular vehicle that the wheel converter 20, 22 (right side, left side) is being attached to. As shown, the outline or perimeter of the first plate 212 is generally trapezoidal and has an eight bolt pattern. However, it is envisioned that other first plate configurations and bolt patterns that correspond to different makes and models may be used and are within the scope of this invention (see, for example FIGS. 32, 33 and 34, where the outline or perimeter of the first plate depicted in an alternative embodiment has a generally octagonal configuration). Continuing on, the first plate 212 includes a center aperture or through hole 219 having an axial length that may be extended by a sleeve 220 and a collar 224, which extend from the first and second surfaces 214, 216 of the first plate 212, and which include interior surfaces 222, 226 that are congruent (or coincident) with the interior surface of the center aperture 219. The use of the sleeve 220 and collar 224 serve to distribute bending stresses and shocks that arise during normal operation of the mounting assembly. The collar 224 may be further strengthened with the provision of one or more gussets 228 that are arranged about the collar 224 and which extend between the second surface 216 and the collar 224. As will be understood, the end of the collar 224 may be provided with a race 230, against which a portion of a link 250 may slidingly contact.

The link 250 comprises a first segment 252, a connecting arm 270, and a second segment 280 with the first and second segments being retained by the connecting arm 270 so that they are in a substantial parallel alignment. More specifically, the first segment 252 comprises a cylindrically shaped pivot pin 254 having a substantially circular cross-section, a first end 256, and a second end 262 with a shoulder 264. The pivot pin 254 is sized so that it may be inserted into the center aperture 219 of the first plate 212 until the shoulder 264 abuts the race 230 of the collar 224. Preferably, bushings 240, 242, which facilitate rotation of the pivot pin, are interposed between the exterior surface of the pivot pin and the interior surfaces of the center aperture 219, the sleeve 222, and the collar 226. The bushings may be provided with lubrication through an internal passage in the collar, with one end of the internal passage provided with a grease fitting, as is known in the art. After the pivot pin 254 has been inserted into the apertured first plate 212 it may be secured therein by a cap 258 that is secured to a transverse surface at the first end 256 by at least one and preferably two bolts 260 that are received within threaded apertures. As the pivot pin and cap rotate, the cap will slidingly engage the end of the sleeve 220. Note that the cap 258 is in communication with the lubricant that is introduced through the internal lubrication passage. As will be appreciated, the cap 258 will prevent the first segment from being accidentally removed from the apertured plate during normal operation.

The second end 262 of the pivot pin 254 is connected to the first end of an arm 270 having a first end 272, middle 274, and a second end 276. The arm 270 is arranged so that it is generally transverse to the rotational axis 266 of the pivot pin 254. The second end 276 of the arm 270 is connected to the first end 284 of the second segment 280 of the link 250 in a substantially transverse relation. The second segment 280 of the link 250 comprises a longitudinal shaft 282 having an angular cross-section, a first end 284 with a shoulder 285, and a second end 286 with a threaded aperture 288.

The second segment 280 of the link 250 is configured to be connected to a second attachment member 300. Generally, the second attachment member 300 comprises an elongated housing 302 having a base 304 with one or more flanges 306, 308, 310 and a plurality of walls 314, 316, 318 that define first and second ends 320, 322 of the housing 302, and an interior space 324. More specifically, the flanges 306, 308, and 310 of the housing 302 extend transversely therefrom towards the first and second ends 72, 74, respectively, of the frame 40. Flange 306 faces forwardly and extends substantially along the length of the housing, while flanges 308, 310 extend rearwardly from the housing 303. In addition, flanges 308 and 310 a spaced apart from each other so that they are able to accommodate a portion of the rearwardmost roller 84 so that it may freely rotate therebetween. Each of the flanges 306, 308, 310 are provided with one or more apertures 312 that may be aligned with apertures 68 in the top wall 66 of the second U-shaped frame 60, and which may be secured to the top wall 66 of the frame with fastening elements 70 such as bolts. The walls 314, 316, 318 that define the interior space 324 of the housing 302 are configured so as to allow the angular shaft 282 to freely rotate within the housing 302. This angular rotation is limited by the provision of one or more elongated spring elements 330 that are positioned between the flats of the angled shaft 482 and the interior angles formed by the walls 314, 316, 318 and the base 304 of the housing 302. As depicted, there are four elongated spring elements 330 that are used in conjunction with the shaft 282 and the housing 302. It will be appreciated that the spring elements 330 will be compressed between the angled faces of the shaft 282 and the interior walls of the housing 302 as the shaft 282 rotates in either a clockwise or counterclockwise direction. Thus, the shaft 282 is biased towards a neutral position. The second end 322 of the housing 302 includes a plurality of threaded apertures that are spaced about its perimeter and which are configured to receive threaded fasteners that are used to retain a protective cover 290 over its otherwise open end. It will be appreciated that the cover 290 prevents extraneous material from entering the interior space 324 of the housing 302. The cover 290 is provided with a centrally located aperture that is configured to rotatably admit the body of a fastening element 294, and the body of the fastening element 294 is configured to be received within an aperture 288 located at the second end 286 of shaft 282. Preferably, a bushing 292 is interposed between the head of the fastening element 294 and the cover 290 so as to permit and facilitate rotation of the shaft 282 and the fastening element 294 that is connected thereto. As will be appreciated, the fastening element 294 serves to rotatingly retain and orient the shaft 282 within the interior space 234 of the housing 302.

As illustrated in FIGS. 14-20, the front mounting assembly 410 is essentially the same as the rear mounting assembly 210. The first attachment member 412 of the front mounting assembly 410 has a first surface 414, a second surface 416, and a plurality of apertures 418 that are configured to have the bolt pattern of the particular vehicle that the track assembly 30 is being attached to. As shown, the outline of the first plate 412 is generally trapezoid and has an eight bolt pattern. However, it is envisioned that other first plate configurations and bolt patterns that correspond to different makes and models may be used. Continuing on, the first plate 412 includes a center aperture or through hole 419 whose axial length may be extended by a sleeve 420 and a collar 424 which extend from the first and second surfaces 414, 416 of the first plate 412, and which include interior surfaces 422, 426 that are congruent (or coincident) with the interior surface of the center aperture 419. The use of the sleeve 420 and collar 424 serve to distribute bending stresses and shocks that arise during normal operation. The collar 424 has a race 430, against which a portion of a link 450 may contact. The collar 424 may be further strengthened with the provision of one or more gussets 428 that are arranged about the collar 424 and which extend between the second surface 416 to the collar 424.

The link 450 comprises a first segment 452, a connecting arm 470, and a second segment 480 with the first and second segments being retained by the connecting arm so that they are in a substantial parallel arrangement. More specifically, the first segment 452 comprises a cylindrically shaped pivot pin 454 having a substantially circular cross-section, a first end 456, and a second end 462 with a shoulder 464. The pivot pin 454 is sized so that it may be inserted into the center aperture 419 of the first plate 412 until the shoulder 464 abuts the race 430 of the collar 424. Preferably, bushings 440, 442, which facilitate rotation of the pivot pin, are interposed between the exterior surface of the pivot pin and the interior surfaces of the center aperture 419, the sleeve 422, and the collar 426. The bushings may be provided with lubrication through an internal passage in the collar, with one end of the internal passage provided with a grease fitting, as is known in the art. After the pivot pin 454 has been inserted into the apertured first plate 412 it may be secured therein by a cap 458 that is secured to a transverse surface at the first end 456 by at least one and preferably two bolts 460 that are received within threaded apertures. As the pivot pin and cap rotate, the cap will slidingly engage the end of the sleeve 422. Note that the cap 458 is in communication with the lubricant that is introduced through the internal lubrication passage. As will be appreciated, the cap 458 will prevent the first segment from being accidentally removed from the apertured plate during normal operation.

The second end 462 of the pivot pin 454 is connected to the first end 472 of an arm 470 having a first end 472, middle 474, and a second end 476. The arm 470 is arranged so that it is generally transverse to the rotational axis 466 of the pivot pin 454. The second end 476 of the arm 470 is connected to the first end 484 of the second segment 480 of the link 450 in a substantially transverse relation. The second segment 480 of the link 450 comprises a longitudinal shaft 482 having an angular cross-section, a first end 484 with a shoulder 485, and a second end 486 with a threaded aperture 488.

The second segment 480 of the link 450 is configured to be connected to a second attachment member 500. Generally, the second attachment member 500 comprises an elongated housing 502 having a base 504 with one or more flanges 506, 508, and a plurality of walls 514, 516, 518 that define first and second ends 520, 522 of the housing 502, and an interior space 524. More specifically, the flanges 506, 508 of the housing 502 extend transversely therefrom in a generally parallel direction so that they are able to straddle the frame 40. Each of the flanges 506, 508 are provided with an aperture 510, 512 that may be aligned with apertures 56 in the inner and outer side walls 44, 46 of the first or forwardmost U-shaped frame section 42, so that the housing 502 may be connected to the frame 40 with a pin 540. As depicted, one end of the pin 540 is provided with a flange 541 that has an aperture that is configured to admit a fastening element 543 that is used to connect the pin 540 to the housing 500 and prevent the housing from accidentally detaching from the U-shaped frame section 42. Preferably, the center points of the apertures 510, 512 of the parallel flanges 506, 508 are spaced from the base 504 of the housing 502 by a distance that is greater than the distance between the center points of the apertures 56 of the inner and outer side walls 44, 46 of the U-shaped frame section 42, relative to its top wall 48. This has the effect of positioning the base 504 of the housing 502 above the top wall 48 of the frame 40 by a predetermined distance 542 so that there is clearance therebetween. As will be appreciated, this forms a pivotable connection and allows the housing 502 to move forwardly and rearwardly with respect to the frame 40. This, in turn, allows the articulated rear and front mounting assemblies 210, 410 to be used to their fullest extent whereby they may move independently from each other, as opposed to being constrained to move in unison as with a typical four-bar linkage system. It is envisioned that other similar motion compensators may be used and are within the scope of this invention. For example, the base 504 of the housing 502 may be provided with flanges 506, 508 that extend transversely therefrom towards the first and second ends 72, 74 of the frame 40 in a manner similar to the housing flanges 506, 508 of the rear mounting assembly 210. However, instead of rigidly attaching the housing 502 to the frame 40 as with the rear mounting assembly 210, the housing 502 could be movably connected to the frame 40 so that it may slide forwardly and rearwardly along the longitudinal axis of the frame 40. The walls 514, 516, 518 that define the interior space 524 of the housing 502 are configured so as to allow the angular shaft 482 to freely rotate within the housing 502. This angular rotation is limited by the provision of elongated spring elements 530 that are positioned between the flats of the angled shaft 482 and the interior angles formed by the walls 514, 516, 518 and the base 504 of the housing 502. As depicted, there are four elongated spring elements 530 that are used in conjunction with the shaft 482 and the housing 502. It will be appreciated that the spring elements 530 will be compressed between the angled faces of the shaft 482 and the interior walls of the housing 502 as the shaft 482 rotates in either a clockwise or counterclockwise direction. Thus, the shaft 482 is biased towards a neutral position. The second end 522 of the housing 502 includes a plurality of threaded apertures about its perimeter that are configured to receive threaded fasteners that are used to retain a protective cover 490 over its otherwise open end. It will be appreciated that the cover 490 prevents extraneous material from entering the interior space 524 of the housing. The cover 490 is provided with a centrally located aperture that is configured to rotatably admit the body of a fastening element 494 and the body of the fastening element 494 is configured to be received within an aperture 488 located at the second end 486 of shaft 482. Preferably, a bushing 492 is provided between the head of the fastening element 494 and the cover 490 so as to permit and facilitate rotation of the shaft 482 and the fastening element 494. As will be appreciated, the fastening element 494 serves to rotatingly retain and orient the shaft 482 within the interior space 524 of the housing 502.

As will be appreciated, the articulating mounting assemblies 210, 410 attenuate jolts and vibrations that are generated when the vehicle 10 travels over uneven ground. The articulating connection also allows a vehicle body to pitch forward or backward while the track assembly maintains substantial contact with the ground. For example, when the body of a vehicle pitches backward, the first or front roller is able to maintain contact with the ground, and when the body of the vehicle pitches forward, the second or rear roller is able to maintain contact with the ground. This is not possible with existing, traditional skid-steer type vehicles. As will be appreciated, the wheel converters provide a vehicle with greater traction and control over a greater range of operating conditions than is possible with a wheeled vehicle that has been provided with an endless track.

Now also referring to FIG. 32, converting a skid-steer vehicle into a tracked vehicle is fairly straightforward. After one side of the vehicle 10 has been elevated and properly supported, the wheels 12 on that side are removed. Generally, after the wheels 12 have been removed, the axle housings (or drive units) 19 are disconnected from the vehicle 10 and replaced with front and rear mounting assemblies 410, 210. Then, a track assembly 30 is attached to the mounting assemblies 210, 410 and conduit terminals 18, located on access panel 16 are connected to the conduits 172, 174 of the motive source 170 of the track assembly 30. More specifically, the access panel 16 to the equipment bay of the vehicle 10 is removed so that the chain drives, which are connected to a drive unit 19, may be loosened and removed from the drive sprockets of the axle housings (not shown). After the chain drives have been removed, the axle housings may be removed from the vehicle frame after the axle housing attachment nuts have been unbolted (not shown). Usually, the axle housings can be removed by slipping the axle housing off attachment bolts, which protrude from the frame. After the axle housings and chain drives have been removed, the control conduits (such as hydraulic lines, which typically include two drive lines, a case drain line and a brake line) are disconnected from the drive unit 19 and the drive unit 19 is removed from the bay. Then, front and rear mounting assemblies 410, 210 are connected to the vehicle 10 at the axle housing cavities 21 using existing bolts and nuts. After the mounting assemblies 210, 410 have been attached to the vehicle 10, a track assembly 30 is connected to the mounting assemblies. However, before the track assembly 30 is connected to the mounting assemblies 210, 410, the length "L" of the frame 40 and the number of intermediate or bogey wheels 88 should be determined. Once those determinations are made, the frame length "L" can be adjusted, the requisite number of intermediate wheels 88 can be positioned and secured, and the U-shaped frame sections 42, 60 can be secured to each other. See, for example, FIG. 30, which shows a frame length "L-1" extended and which includes an additional intermediate roller 88. See also, FIG. 31, which shows a frame length "L-2" in which an intermediate roller 88 has been removed. The track assembly 30 can then be connected to the mounting assemblies 210, 410 using fastening elements such as nuts and bolts. After the track assembly 30, which preferably includes an endless track 200, has been connected to the mounting assemblies 210, 410, the internal control conduits which have been disconnected prior to removal of the internal drive units of the vehicle are connected to the conduit terminals 18 which extend through the access panel 16. The access panel 16 is then reconnected to the vehicle 10, and the conduits 172, 174 of motive source 170 on the track assembly 30 are connected to the appropriate conduit terminals 18. Alternatively, the access panel 16 may be omitted and the conduits 172, 174 may be connected directly to the internal control conduits of the vehicle. Attachment is now complete and the vehicle may be lowered onto the ground. The wheels of the other side of the vehicle may now be converted in the same manner. As will be understood, the removal of the internal drive mechanism, wheels and rims of a vehicle being converted can lighten the weight of the vehicle by a considerable amount; on the order of fifteen hundred pounds. Preferably, this loss offsets the weight of the track assembly and has the net effect of reducing the pounds per square inch that the track exerts on the ground. Thus, the converted vehicle is able to negotiate terrain that other known conversion systems cannot. It will be appreciated that the above mentioned procedure may be varied without departing from the spirit and scope of the invention.

Inherent advantages of the conversion system of the present invention are many fold. It can be used to convert a wheeled machine into a dedicated track machine without welding or cutting modifications. It can fully suspend a previously unsuspended skid-steer vehicle by providing each attachment point with its own articulated torsion mounting assembly. Operational characteristics such as speed and power can be changed by removing the motive source on the track assembly and replacing it with another motive source having different operational characteristics and parameters. For example, a motive source can be smaller because it takes less energy to operate the track assemblies. A converted vehicle is not subject to internal chain, drive motor, or axle failures. Skid-steer vehicles with old or broken drive components can be rehabilitated with the track assembly. And if the customer so desires, the track assemblies of a converted vehicle can be removed and replaced with wheels.

Figure 33:
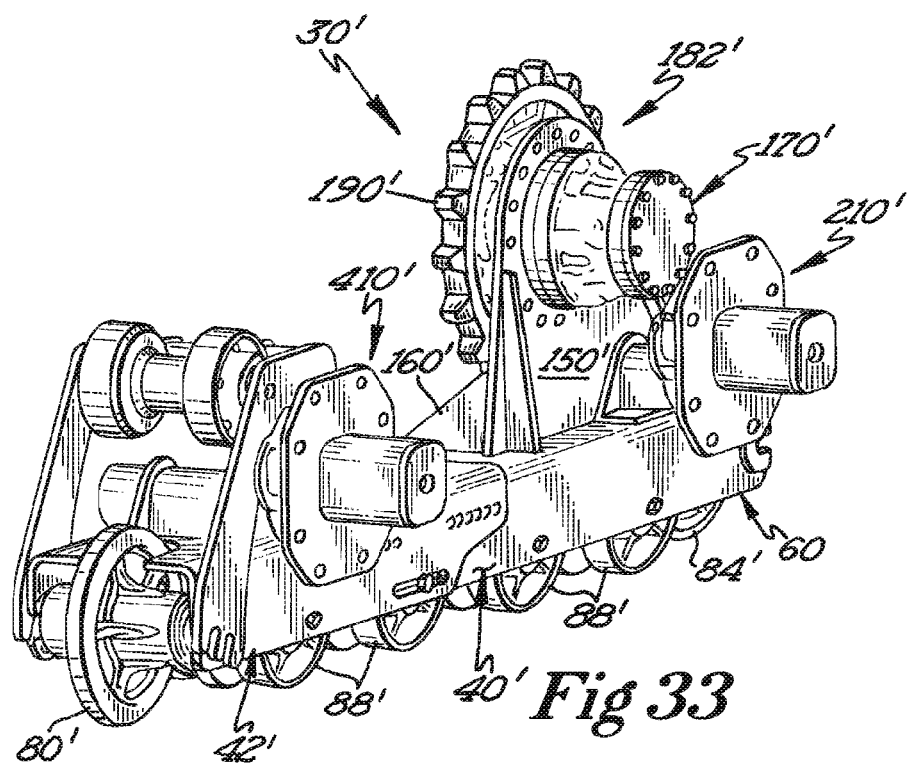
FIG. 33 is a partial perspective view of an alternative embodiment of the front and rear mounting assemblies.
Figure 34:
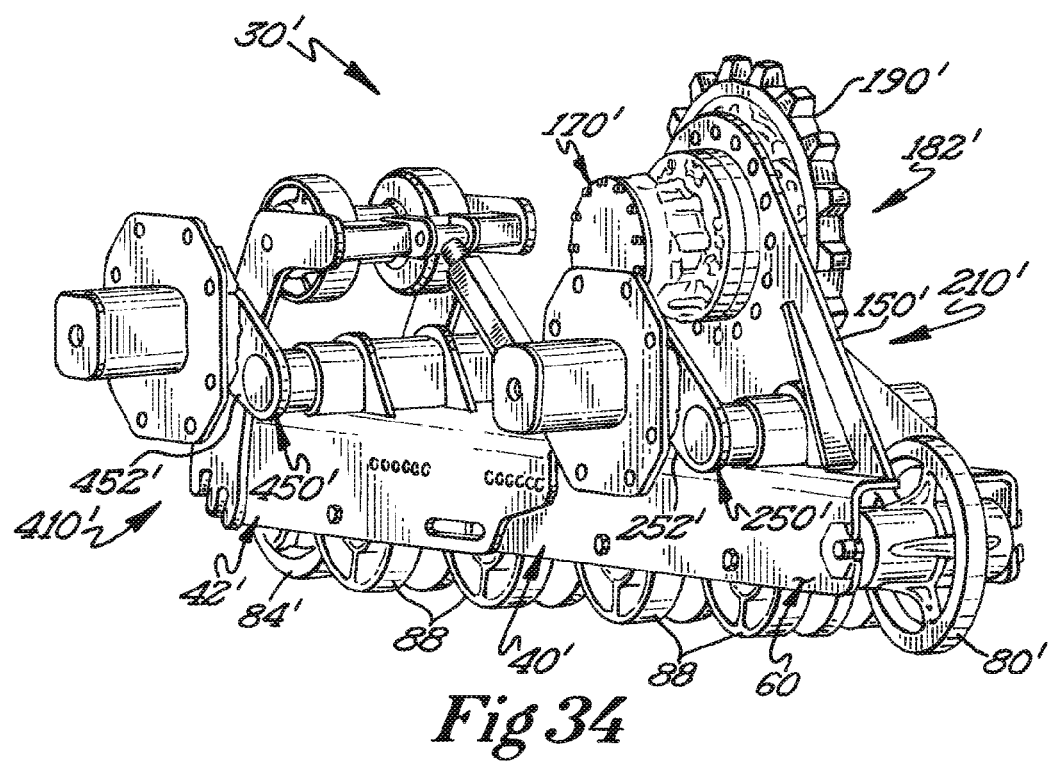
FIG. 34 is a partial perspective view of an alternative embodiment of FIG. 33 illustrating the front and rear mounting assemblies.

An alternative embodiment of the track assembly 30' is depicted in FIGS. 33 and 34 in which the orientation of the mounting assemblies 210', 410' have been reversed, with the second segment 280' of the link 250' (the torsion connection) arranged for insertion into the wheel axle cavity (not shown), and with the first segment 252' arranged for pivotal connection to the frame 40'.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

What is claimed is:

1. A mounting assembly suitable for use in converting a vehicle having a body and a plurality of wheels into a tracked vehicle, the mounting assembly comprising:
    a first attachment member configured and arranged to be removably attached to a vertical side of the body of the vehicle over an aperture that is exposed in the vertical side when a first wheel axle has been removed from the vehicle, the first attachment member comprising a first surface, a second surface and a transverse through hole extending between the first and second surfaces, with the mounting assembly positionable so that the through hole is brought into registry with the aperture when the mounting assembly is attached to the vertical side of the vehicle, the first attachment member further comprising a plurality of apertures that extend between the first and second surfaces, with the plurality of apertures configured and arranged to correspond to at least one preexisting bolt hole pattern of a wheeled vehicle that is being converted into a tracked vehicle; the mounting assembly further comprising a link having a first segment configured and arranged to be received and retained in the through hole of the first attachment member; wherein the first surface of the first attachment member includes a sleeve that has an inner cross-sectional dimension that is substantially coincident with an inner cross-sectional dimension defined by the transverse through hole, whereby the through hole may be extended beyond the first surface of the first attachment member;
    wherein the first surface of the first attachment member includes a sleeve that has an inner cross-sectional dimension that is substantially coincident with an inner-cross-sectional dimension defined by the transverse through hole, whereby the through hole may be extended beyond the first surface of the first attachment member.

2. The mounting assembly of claim 1, wherein the second surface of the first attachment member includes a collar that has an inner cross-sectional area dimension that is substantially coincident with the inner cross-sectional dimension defined by the transverse through hole, whereby the through hole may be extended beyond the second surface of the first attachment member.

3. The mounting assembly of claim 1, wherein the second surface of the first attachment member includes a collar that has an inner cross-sectional area dimension that is substantially coincident with an inner cross-sectional dimension defined by the transverse through hole, whereby the through hole may be extended beyond the second surface of the first attachment member.

4. The mounting assembly of claim 3, further comprising at least one gusset that is connected to the second surface of the first attachment member and an external surface of the collar.

5. The mounting assembly of claim 3, further comprising a sleeve that has an inner cross-sectional dimension that is substantially coincident with the inner cross-sectional dimension defined by the transverse through hole, whereby the through hole may be extended beyond the first surface of the first attachment member.

6. The mounting assembly of claim 1, further comprising a cap that is removably attachable to a first end of the first segment, wherein the cap is configured and arranged to prevent the first segment from being withdrawn from the through hole.

7. The mounting assembly of claim 1, wherein the first segment is rotatably retained in the through hole.

8. The mounting assembly of claim 1, wherein the link includes a second segment that is operatively connected to the first segment, wherein the first and second segments are substantially parallel with respect to each other.

9. An apparatus suitable for use in converting a vehicle having a body and a plurality of wheels into a tracked vehicle, the apparatus comprising:
    a first mounting assembly comprising:
        a first attachment member configured and arranged to be removably attached to a vertical side of the body of the vehicle over a first aperture that is exposed in the vertical side when a first wheel axle has been removed from the vehicle, the first attachment member comprising a first surface, a second surface and a transverse through hole extending between the first and second surfaces, with the first mounting assembly positionable so that the through hole is brought into registry with the first aperture when the first mounting assembly is attached to the vertical side of the vehicle, the first attachment member further comprising a plurality of apertures that extend between the first and second surfaces, with the plurality of apertures configured and arranged to correspond to at least one preexisting bolt hole pattern of a wheeled vehicle that is being converted into a tracked vehicle;
    a second mounting assembly comprising:
        a second attachment member configured and arranged to be removably attached to a vertical side of the body of the vehicle over a second aperture that is exposed in the vertical side when a second wheel axle has been removed from the vehicle, the second attachment member comprising a first surface, a second surface and a transverse through hole extending between the first and second surfaces, with the second mounting assembly positionable so that the through hole is brought into registry with the second aperture when the second mounting assembly is attached to the vertical side of the vehicle, the second attachment member further comprising a plurality of apertures that extend between the first and second surfaces, with the plurality of apertures configured and arranged to correspond to at least one preexisting bolt hole pattern of a wheeled vehicle that is being converted into a tracked vehicle; and,
    wherein the first surface of at least one of the first or second attachment members includes a sleeve that has an inner cross-sectional dimension that is substantially coincident with an inner cross-sectional dimension defined by the transverse through hole of said first or second attachment member, whereby the through hole of said first or second attachment member may be extended beyond the first surface of the first or second attachment member.

10. The apparatus of claim 9, wherein the second surface of at least one of the first or second attachment members includes a collar that has an inner cross-sectional area dimension that is substantially coincident with the inner cross-sectional dimension defined by the transverse through hole of said first or second attachment member, whereby the through hole of said first or second attachment member may be extended beyond the second surface of the first or second attachment member.

11. The apparatus of claim 9, further comprising a link having a first segment configured and arranged to be received and retained in one of the first or second through holes of the first or second attachment member.

12. The apparatus of claim 11, further comprising a cap that is removably attachable to a first end of the first segment, wherein the cap is configured and arranged to prevent the first segment from being withdrawn from the first or second through hole of the first or second attachment member.

13. The apparatus of claim 11, wherein the link includes a second segment that is operatively connected to the first segment, wherein the first and second segments are substantially parallel with respect to each other.

14. The apparatus of claim 9, wherein the second surface of at least one of the first or second attachment members includes a collar that has an inner cross-sectional area dimension that is substantially coincident with an inner cross-sectional dimension defined by the transverse through hole of said first or second attachment member, whereby the through hole may be extended beyond the second surface of the first or second attachment member.

15. The apparatus of claim 14, wherein at least one of the first or second attachment members further comprises at least one gusset that is connected to the second surface of the said first or second attachment member and an external surface of the collar.

16. The apparatus of claim 14, wherein each of the first or second attachment members further comprises a sleeve that has an inner cross-sectional dimension that is substantially coincident with the inner cross-sectional dimension defined by the transverse through hole of the respective attachment member, whereby the through hole may be extended beyond the first surface of the respective attachment member.

17. An apparatus in combination with a vehicle having a body and a plurality of wheel axles, the apparatus comprising:
    a first mounting assembly comprising:
        a first attachment member configured and arranged to be removably attached to a vertical side of the body of the vehicle over a first aperture that is exposed in the vertical side when a first wheel axle has been removed from the vehicle, the first attachment member comprising a first surface, a second surface and a transverse through hole extending between the first and second surfaces, with the mounting assembly positionable so that the through hole is brought into registry with the first aperture when the mounting assembly is attached to the vertical side of the vehicle, the first attachment member further comprising a plurality of apertures that extend between the first and second surfaces, with the plurality of apertures configured and arranged to correspond to at least one preexisting bolt hole pattern of a wheeled vehicle that is being converted into a tracked vehicle; and,
    a second mounting assembly comprising:
        a first attachment member configured and arranged to be removably attached to a vertical side of the body of the vehicle over a second aperture that is exposed in the vertical side when a second wheel axle has been removed from the vehicle, the first attachment member comprising a first surface, a second surface and a transverse through hole extending between the first and second surfaces, with the mounting assembly positionable so that the through hole is brought into registry with the second aperture when the mounting assembly is attached to the vertical side of the vehicle, the second attachment member further comprising a plurality of apertures that extend between the first and second surfaces, with the plurality of apertures configured and arranged to correspond to at least one preexisting bolt hole pattern of a wheeled vehicle that is being converted into a tracked vehicle.

\* \* \* \* \*